(12) United States Patent
Renner et al.

(10) Patent No.: US 7,412,050 B2
(45) Date of Patent: Aug. 12, 2008

(54) CONFERENCE CALLS VIA AN INTELLIGENT CALL WAITING INTERFACE

(75) Inventors: W. Karl Renner, Great Falls, VA (US); Stephen Vaughan Murphy, Ashburn, VA (US)

(73) Assignee: AOL LLC, a Delaware Limited Liability Company, Dulles, VA (US)

(*) Notice: Subject to any disclaimer, the term of this patent is extended or adjusted under 35 U.S.C. 154(b) by 929 days.

(21) Appl. No.: 10/895,389

(22) Filed: Jul. 21, 2004

(65) Prior Publication Data

US 2005/0074107 A1 Apr. 7, 2005

Related U.S. Application Data

(63) Continuation-in-part of application No. 10/674,797, filed on Oct. 1, 2003, now Pat. No. 6,999,577.

(51) Int. Cl.
*H04M 1/64* (2006.01)
(52) U.S. Cl. .............................. 379/215.01; 379/202.01
(58) Field of Classification Search ............ 379/215.01, 379/142.06, 142.08, 207.14, 211.01, 265.02–265.12, 379/158, 202.01; 370/352
See application file for complete search history.

(56) References Cited

U.S. PATENT DOCUMENTS

| | | | |
|---|---|---|---|
| 5,329,578 A | 7/1994 | Brennan et al. | |
| 5,375,161 A | 12/1994 | Fuller et al. | |
| 5,408,526 A | 4/1995 | McFarland et al. | |
| 5,537,467 A | 7/1996 | Cheng et al. | |
| 5,548,636 A | 8/1996 | Bannister et al. | |
| 5,557,659 A | 9/1996 | Hyde-Thomson | |
| 5,625,676 A | 4/1997 | Greco et al. | |
| 5,631,904 A | 5/1997 | Fitser et al. | |
| 5,651,054 A | 7/1997 | Dunn et al. | |

(Continued)

FOREIGN PATENT DOCUMENTS

EP 1 309 164 5/2003

(Continued)

OTHER PUBLICATIONS

Supplementary European Search Report, PCT/US2004032435, dated May 4, 2007, 3 pgs.

(Continued)

*Primary Examiner*—William J Deane
(74) *Attorney, Agent, or Firm*—Fish & Richardson P.C.

(57) ABSTRACT

Initiating a conference call using a call waiting graphical user interface includes receiving an indication that an incoming telephone call is directed to a telephone number and identifying an account associated with the telephone number to which the incoming call is directed. Configuration data related to the account is accessed. A first online identity and a second online identity associated with the account are identified based on the configuration data accessed. A first electronic communication is sent to the first online identity and a second electronic communication is sent to the second online identity. The first online identity can respond to the first electronic communication and the second online identity can respond to the second electronic communication. A conference call between the caller and the first and second online identities is initiated conditioned on whether the responses by the first and second online identities indicate that both the first and second online identities wish to take the call.

87 Claims, 14 Drawing Sheets

U.S. PATENT DOCUMENTS

| | | | |
|---|---|---|---|
| 5,668,862 | A | 9/1997 | Bannister et al. |
| 5,703,943 | A | 12/1997 | Otto |
| 5,805,587 | A | 9/1998 | Norris et al. |
| 5,809,128 | A | 9/1998 | McMullin |
| 5,812,653 | A | 9/1998 | Jodoin et al. |
| 5,841,966 | A | 11/1998 | Irribarren |
| 5,848,134 | A | 12/1998 | Sekiguchi et al. |
| 5,894,504 | A | 4/1999 | Alfred et al. |
| 6,144,644 | A | 11/2000 | Bajzath et al. |
| 6,215,857 | B1 | 4/2001 | Kasiviswanathan |
| 6,282,275 | B1 | 8/2001 | Gurbani et al. |
| 6,295,341 | B1 | 9/2001 | Muller |
| 6,301,609 | B1 | 10/2001 | Aravamudan et al. |
| 6,366,661 | B1 | 4/2002 | Devillier et al. |
| 6,404,747 | B1 | 6/2002 | Berry et al. |
| 6,453,164 | B1 | 9/2002 | Fuller et al. |
| 6,463,038 | B1 | 10/2002 | Wilson |
| 6,463,145 | B1 | 10/2002 | O'Neal et al. |
| 6,477,246 | B1 | 11/2002 | Dolan et al. |
| 6,496,501 | B1 | 12/2002 | Rochkind et al. |
| 6,518,994 | B1 | 2/2003 | Johnson et al. |
| 6,574,599 | B1 | 6/2003 | Lim et al. |
| 6,577,622 | B1 | 6/2003 | Schuster et al. |
| 6,671,365 | B2 | 12/2003 | Kemppainen |
| 6,738,461 | B2 | 5/2004 | Trandal et al. |
| 2003/0133558 | A1 | 7/2003 | Kung et al. |

FOREIGN PATENT DOCUMENTS

| | | |
|---|---|---|
| WO | WO 00/60809 | 10/2000 |
| WO | 02/25907 | 3/2002 |

OTHER PUBLICATIONS

Supplementary European Search Report, PCT/US2004023383, dated May 4, 2007, 3 pgs.

International Search Report, Application No. PCT/US04/23383, dated Mar. 28, 2005.

International Search Report, Application No. PCT/US04/32435, dated Apr. 7, 2005.

Rick James: "FINALLY! Interactive 'Call Waiting' While You're Surfing?", Internet Document, [Online], pp. 1-4, Retrieved from the Internet: www.monitor.ca/monitor/issues/vol4iss12/feature7.html, [retrieved on Sep. 2, 2004].

US 7,412,050 B2

CONFERENCE CALLS VIA AN INTELLIGENT CALL WAITING INTERFACE

CROSS REFERENCE TO RELATED APPLICATION

The application is a continuation-in-part of and incorporates by reference U.S. patent application Ser. No. 10/674,797, filed Oct. 1, 2003 now U.S. Pat. No. 6,999,577, and titled MULTI-USER CALL WAITING. This application also incorporates by reference U.S. patent application Ser. No. 10/414,167, filed Apr. 15, 2003, and titled COMMUNICATION DEVICE MONITORING, U.S. patent application Ser. No. 10/320,712, filed Dec. 17, 2002, and titled CASCADED DELIVERY OF AN ELECTRONIC COMMUNICATION, and U.S. patent application Ser. No. 10/674,821, filed Oct. 1, 2003, and titled INTELLIGENT CALL SCREENING OF TRADITIONAL TELEPHONY CALLS.

TECHNICAL FIELD

This document relates to a call waiting system that enables multiple users associated with a telephone number to be made aware of an incoming call and to launch a conference call in response to the incoming call.

BACKGROUND

Several techniques are known for establishing conference calls between three or more parties. For example, a host may call each party to the conference and individually bridge each called party onto the conference call. Alternatively, a "dial-in" telephone number with associated access code may be used to join all parties at a common bridge. Each party dials into the bridge, eliminating the need for the host to call each party individually. In yet another technique, a host calls a central number and specifies the participants to the conference call. The network then places outbound calls to each of the specified participants, and the participants join the conference call by answering the outbound calls.

SUMMARY

In one general aspect, initiating a conference call using a call waiting graphical user interface includes receiving an indication that an incoming telephone call is directed to a telephone number and identifying an account associated with the telephone number to which the incoming call is directed. Configuration data related to the account is accessed. A first online identity and a second online identity associated with the account are identified based on the configuration data accessed. A first electronic communication is sent to the first online identity and a second electronic communication is sent to the second online identity. The first online identity can respond to the first electronic communication and the second online identity can respond to the second electronic communication. A conference call between the caller and the first and second online identities is initiated conditioned on whether the responses by the first and second online identities indicate that both the first and second online identities wish to take the call.

Implementations may include one or more of the following features. For example, sending the second electronic communication may be conditioned on the response of the first online identity to the first electronic communication.

Initiating a conference call may further include determining the availability of the first online identity to receive the first electronic communication associated with the telephone call. Sending the first electronic communication may be conditioned on whether the first online identity is determined to be available to receive the first electronic communication. Determining the availability of the first online identity includes checking the online status for the first online identity and sending the first electronic communication includes sending the first electronic communication if the first online identity is determined to be online. Enabling the first online identity to respond to the first electronic communication includes enabling the first online identity to respond to the first electronic communication while the caller is waiting for call disposition. The first and second online identities may include user identifiers through which an online status of an associated user may be determined.

Identifying an account based on a telephone call includes identifying an account based on call-related information received from a telephone network. The call-related information may include a call destination telephone number and may be extracted from an integrated services digital network call setup.

Initiating a conference call may further include receiving from a telephone network call origin information that includes a caller telephone number and is received through an automatic number identification service. The first and second electronic communications may include a portion of the call origin information.

Enabling the first online identity to respond to the first electronic communication may include enabling the first online identity to select from among one or more call processing options. The call processing options may be personalized to the first online identity. The call processing options may include an option to take a message from the caller, take the call, ignore the call, send an audio message to the caller, and display a list of other online identities associated with the called telephone number or account who have selected to take the call.

Enabling the second online identity to respond to the second electronic communication may include enabling the second online identity to select from among one or more call processing options and initiating a conference call may include initiating a conference call conditioned on whether the first and second online identities both select an option to take the call. Initiating a conference call may include sending to the first online identity a first electronic conference call invitation that is distinct of the first electronic communication, enabling the first online identity to respond to the first electronic conference call invitation, sending to the second online identity a second electronic conference call invitation that is distinct of the second electronic communication, enabling the second online identity to respond to the second electronic conference call invitation, and initiating a conference call between the caller and the first and second online identities conditioned on whether the responses to the first and second electronic conference call invitations indicate that both the first and second online identities wish to participate in the conference call.

Enabling the first online identity to respond to the first electronic conference call invitation may include enabling the first online identity to select from among one or more options. The options may be personalized to the first online identity.

The options may include call participation options. The call participation options may include an option selectable to actively participate in a conference call with the caller, to allow the user to listen but not speak when participating in the conference call with the caller, to not participate in a conference call with the caller, and to send a message to the second online identity. The message may be a text message or an audio message. The call participation options may include an option selectable to record the conference call. The option to record the conference call may be selectable to record the conference call and to send the recording to the first online identity using e-mail. Initiating a conference call may further comprise enabling the first online identity to perceive a call participation option selected by the second online identity. The online identity may perceive the call participation option selected by the second online identity in a visual display.

The options may include call connection options. The call connection options may include an option to connect to the conference call over a telephone network and an option to connect to the conference call over a data network.

Enabling the first identity to respond to the first conference call invitation may include enabling the first identity to perceive and manipulate a first graphical user interface and enabling the second identity to respond to the second conference call invitation may include enabling the second identity to perceive and manipulate a second graphical user interface. The first and second graphical user interfaces may be the same or different interfaces.

Initiating a conference call may further comprise initiating a call between the caller and the first online identity conditioned on whether the first online identity selects the option to take the call in response to the first electronic communication. Sending the second electronic communication to the second online identity may include sending the second electronic communication in response to the first online identity selecting to take the call. Enabling the second online identity to respond to the second electronic communication may include enabling the second online identity to respond by selecting to join the call in progress. Initiating a conference call may include converting the call into a conference call between the caller and the first and second online identities conditioned on whether the second online identity selects to join the call in progress. Enabling the second online identity to respond to the second electronic communication may include enabling the second online identity to perceive and manipulate a graphical user interface that is configured to inform the second online identity of the call in progress and enable the second online identity to select to join the call in progress. The graphical user interface also may be configured to inform the second online identity of the identity of the caller and the first online identity.

The details of one or more implementations are set forth in the accompanying drawings and the description below. Other features will be apparent from the description and drawings, and from the claims.

DETAILED DESCRIPTION

Figure 1:
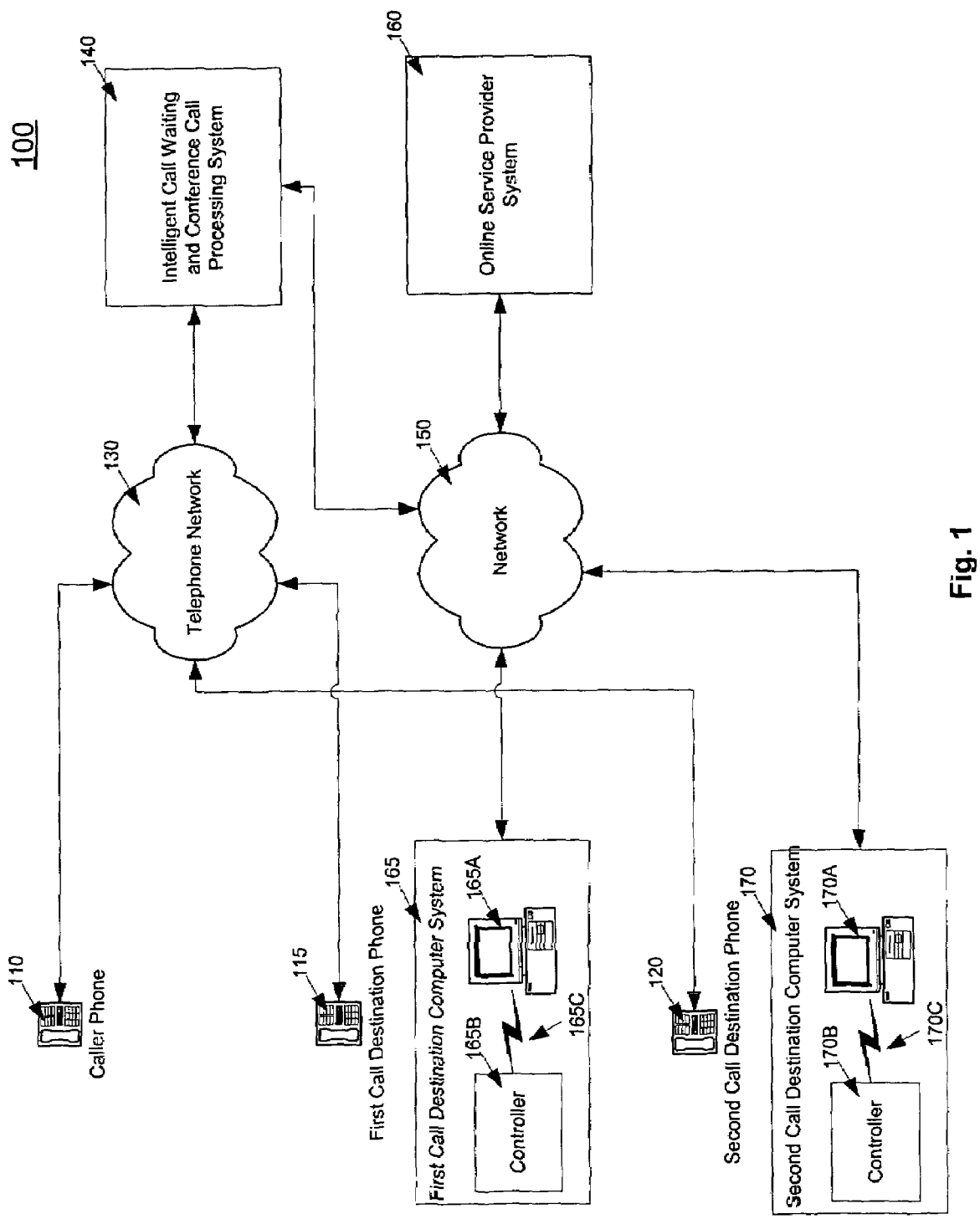
FIG. 1 is a block diagram of a communications system for providing multi-user intelligent call waiting with conference call functionality.

A communications system directs an incoming call or sends information related to an incoming call to online identities associated with a called number who are available to receive such information through means other than telephones to which a telephone network ordinarily directs the incoming call. For example, when a call recipient is engaged in a call on a landline phone to which an incoming call is directed, a notification of the incoming call is sent to user online identities associated with the direct number of the landline phone. The user online identities may be respectively online through, for example, (1) a home computer, (2) a personal digital assistant (PDA), and (3) an office computer. Each user online identity may be presented with call handling options enabling the user corresponding to the user online identity to take the call, ignore the call, take a message, play a specific audio message, or forward the call to another phone number. If multiple user online identities select the option to take the call, a conference call is launched between the caller and the multiple user online identities.

In one implementation, a communications system for providing multi-user intelligent call waiting with conference call functionality includes a caller phone configured to place a call to a call destination phone across a telephone network. The telephone network is configured to forward the call to an intelligent call waiting and conference call processing system (ICWCCPS) if the direct number of the call destination phone is busy, not answered after a predetermined number of rings, or otherwise configured to not receive incoming calls. The ICWCCPS receives the call and determines online identities associated with the direct number of the call destination phone. The online identities are user identifiers, such as, for example, screen names, through which a user's online status may be determined.

The ICWCCPS accesses call waiting preferences corresponding to the online identities and identifies which of the online identities may receive a call notification message, e.g., based on the call waiting preferences. The ICWCCPS then determines which of the identified online identities are online (and thus available to receive a call notification message) by sending a request for presence information to an online service provider system. Upon receiving the presence information from the online service provider system, the ICWCCPS generates a call notification message for each identified online identity that is online. The ICWCCPS sends the call notification messages to the online service provider system.

The online service provider system receives the call notification messages and sends in real time the received call notification messages along with format data to the call destination computer systems corresponding to the identified online identities that are online. The call destination computer systems receive the call notification messages and format data, and respond by enabling user perception of the call notification messages.

A call notification message typically includes the online identity of the caller (determined based on, for example, Automatic Number Identification (ANI) information) and a set of options that may be selected by the user to indicate how the call should be handled. Several options that may be selected include playing a specific audio message, ignoring the call, taking a message (i.e., forwarding a call to a voicemail system), and/or forwarding the call to another phone number (e.g., a cell phone number). The call notification message may be presented to a user as a dialog box in a visual display of the call destination computer system. The user may, for example, use a mouse or other input device to click or otherwise select an option presented in the dialog box.

When an option is selected by the user, the option selection is sent to the ICWCCPS in real time through the online service provider system. The ICWCCPS processes the call by sending call handling instructions to the telephone network and/or accessing and sending an audio message to the caller phone. Since multiple users may receive call notification messages corresponding to the same call and may select conflicting options, the intelligent call waiting system may employ a conflict resolution algorithm to process the received option selection data.

If two or more users select to take the call, the ICWCCPS generates a conference call invitation for each user that selects to take the call and, in some implementations, for one or more of the other users that received a call notification message but did not select any option or did not select an option to take the call. The ICWCCPS sends the conference call invitations through the online service provider system to the call destination computer systems associated with those users. The conference call invitations enable the users to select from among a set of options that include conference call participation options and conference call connection options.

The conference call participation options are options selectable to control how a user will participate in the conference call. The conference call participation options may include, but are not limited to, actively participating in the conference call, listening to the conference call, and not participating in the conference call. The conference call participation options may optionally enable a user to provide a reason for not participating in the call. The reason may be conveyed textually or audibly to the other participants by the ICWCCPS. The conference call connection options are options selectable to control how a user will connect to the ICWCCPS. The conference call connection options may include, but are not limited to, an option to participate in the conference call over a traditional telephone connection over a telephone network and an option to participate in the conference call over a data telephone or computer system able to establish and communicate over a bi-directional audio channel over a data network.

The call destination computer systems send the conference call option selections to the online service provider system which relays the conference call option selections to the ICWCCPS. The ICWCCPS processes the conference call option selections to determine which of the users have selected to be participants in the conference call. The ICWCCPS identifies direct numbers associated with the users that desire to participate in the conference call and places outbound telephone calls to each of the direct numbers or otherwise establishes a bi-directional voice communication path with those users. The ICWCCPS launches or initiates a conference call between the users that wish to participate in the conference call and the caller in accordance with the call participation options selected by each participant.

Referring to FIG. 1, in one implementation, a communications system 100 for providing multi-user intelligent call waiting with conference call functionality includes a caller phone 110, a first call destination phone 115, a second call destination phone 120, a telephone network 130, an ICWCCPS 140, a network 150, an online service provider system 160, a first call destination computer system 165, and a second call destination computer system 170. FIG. 1 shows two representative call destinations with associated telephones 115 and 120 and computer systems 165 and 170. The communications system 100, however, may include any number of call destinations.

The caller phone 110 is configured to place a call to the first call destination phone 115 across the telephone network 130. The caller phone 110, the first call destination phone 115, and the second call destination phone 120 may be landline phones that allow communications over the telephone network 130. In another implementation, any one or more of the call destination phones 115, 120 and the caller phone 110 may be a cellular phone or a mobile personal digital assistant (PDA) with embedded cellular phone technology. In yet another implementation, the call destination phone 115, 120 may be integrated with the call destination computer system 165, 170 and operate as a single computer system.

The telephone network 130 is configured to enable direct or indirect voice communications between the caller phone 110, the call destination phones 115, 120, and the ICWCCPS 140. If a user of the caller phone 110 places a call to the first call destination phone 115 and the direct number corresponding to the first call destination phone 115 is busy or not answered after a predetermined number of rings, the telephone network 130 is configured to forward the call to the ICWCCPS 140 (i.e., a call forward busy/no answer service is enabled on the phone line of the first call destination phone 115).

When the call is forwarded to the ICWCCPS 140, the telephone network 130 is configured to send call-related information to the ICWCCPS 140 over a signaling channel. The call-related information includes call origin and call destination information. The call origin information may include the direct number of the caller phone 110 and the time and date when the call was initiated, and the call destination information may include the direct number of the first call destination phone 115. The call origin information may be delivered, for example, through a service known as Automatic Number Identification (ANI), and the call destination information may be delivered, for example, by extracting called number information from the integrated services digital network (ISDN) call setup or, alternatively, through a service known as Dialed Number Identification Service (DNIS).

The telephone network 130 also is configured to receive call handling instructions from the ICWCCPS 140. The call handling instructions are instructions that tell the telephone network 130 how to process a call. The call handling instructions may include, for example, instructions to accept a call, refuse a call, and forward a call to another telephone number (e.g., to a telephone number corresponding to a voicemail system or a different telephone).

The telephone network 130 may include a circuit-switched voice network, a packet-switched data network, or any other network able to carry voice. For example, circuit-switched voice networks may include the Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The ICWCCPS 140 is a computer system configured to receive a call from the caller phone 110 that has been forwarded to the ICWCCPS 140 by the telephone network 130. The ICWCCPS 140 receives the direct number of the first call destination phone 115 (hereinafter "call destination direct number") from the telephone network 130, identifies online identities associated with the call destination direct number, and processes the call in accordance with account-level and online identity-level call waiting preferences associated with the call destination direct number. The online identities associated with the call destination direct number may be identified, for example, by accessing an account record indexed by the, call destination direct number and stored in a configuration data store. The account record includes the online identities and the account-level and online identity-level call waiting preferences.

The account-level call waiting preferences are preferences that are not associated with any particular online identity but rather are associated with all online identities associated with the account. For example, account-level call waiting preferences may include a "black list" of identified phone numbers and a "white list" of identified phone numbers. If the ICWC-CPS 140 receives a call from a caller phone 110 having a direct number on the "black list," the ICWCCPS 140 may ignore the call (i.e., the call is not answered and is allowed to continuously ring) or, alternatively, may send a message to the telephone network 130 or the caller phone 110, e.g., an audio message, telling the caller not to call the direct number of the first call destination phone 115 anymore or an electronic message to the telephone network 130 that inspires an audio message to the cellular phone 110 indicating unavailability of the first call destination phone 115. If the ICWCCPS 140 receives a call corresponding to a direct number on the "white list," the ICWCCPS 140 may automatically forward the call to another number (e.g., a specified cell phone number or voicemail number). Alternatively, the white list may be used as a list of telephone numbers that are not blocked by the ICWCCPS 140. In other words, if a caller's telephone number is not on the white list, the call will automatically be blocked or filtered out by the ICWCCPS 140. This implementation of a white list enables call recipients to filter out telemarketing calls.

The online identity-level call waiting preferences are preferences that are tailored to each online identity. The online identity level preferences include, for example, instructions prohibiting the ICWCCPS 140 from sending a call notification message to a particular online identity when the direct number of the caller phone 110 has been placed on a prohibited list for that online identity. Each online identity may have its own prohibited and/or white lists. The online identity-level preferences also may include instructions regarding how the call notification message sent to an online identity should be formatted and what options should appear in the call notification message.

Furthermore, the online identity-level call waiting preferences may include message delivery preferences that indicate a preferred communication device through which the recipient associated with the online identity wishes to receive the call notification message. For example, the message delivery preferences may indicate that the recipient prefers to receive the call notification message through a personal digital assistant (PDA) rather than through an office desktop computer if the recipient is available online via both the PDA and the desktop computer. The message delivery preferences may depend on the time of the incoming phone call (e.g., if the call is after 9 pm, send the message to the office desktop computer), the communication devices through which the online identity is currently available to receive a call notification message, and/or the identity of the caller.

The online identity-level call waiting preferences may further include parental controls. For example, some online identities may correspond to children and other online identities may correspond to parents. The call waiting preferences of online identities corresponding to children may include instructions prohibiting the ICWCCPS 140 from sending call notification messages to those online identities when they are online or, alternatively, from sending call notification messages to those online identities when they are online during certain times of the day (e.g., late at night or when the child is at school).

For example, the Smith account may include two online identities associated with it, "jillsmith2" corresponding to a user named Jill and "joesmith3" corresponding to a user named Joe. The Smith account has placed phone numbers of various telemarketing businesses on a "black list" and the phone number of Joe's parents on a "white list." Accordingly, the account-level preferences are set to ignore calls from the telemarketing businesses and forward calls from Joe's parents to Joe's cell phone number. Furthermore, the online identity-level preferences for "jillsmith2" are set such that the call notification message presented to Jill includes the following options: ignore the call, take a message, and send an audio message stating, "Please call back later." The online identity-level preferences for "joesmith3" are set such that the call notification message presented to Joe includes the following options: ignore the call, take a message, forward the call to Joe's cell phone, and send an audio message. If the option selected is to send an audio message, Joe is presented with a menu from which he may select one of the following audio messages: "Please call back later," "I'll call you back," "I don't know you," and "Please call my cell phone at (202) 123-4567." Joe and Jill may have recorded the audio messages in their own voice to personalize the messages or, alternatively, may have chosen the messages from a list of prerecorded audio messages. In another implementation, Joe may have included the sending of an audio message stating, "You are being transferred to my cell phone" prior to the forwarding of the call to his cell phone.

The ICWCCPS 140 processes the call by identifying which online identities may receive a call notification message based on the account-level and online identity-level call waiting preferences. The system 140 requests the online status of the identified online identities from the online service provider system 160 and call notification messages for each identified online identity that is online in accordance with the online identity-level preferences. The ICWCCPS 140 sends the call notification messages to the online service provider system 160, which sends along with format data the call notification messages over the network 150 to one or more call destination computer systems 170 for presentation to users. Each user of a call destination computer system 170 selects an option presented in the call notification message, and the option selection is sent to the online service provider system 160 over the network 150. The online service provider system 160 relays the option selection to the ICWCCPS 140, which processes the option selection accordingly.

If no user of a call destination computer selects an option prior to expiration of a predetermined interval of time (e.g., 15 seconds), the ICWCCPS 140 may process a default option selection. The default option selection may be stored as an account-level preference and may correspond to sending an audio message, taking a message (i.e., forwarding the call to a voicemail system), and/or forwarding the call to another number (e.g., a cell phone number).

If multiple user online identities submit option selections for the same call, the ICWCCPS 140 applies a conflict resolution algorithm to determine which option selection of the several received option selections will be processed. The conflict resolution algorithm may be, for example, a "first come, first serve" algorithm that processes the call in accordance with the first option selection received. Alternatively, the conflict resolution algorithm may include collecting option selections corresponding to different online identities over a predetermined interval of time and then processing the call in accordance with the option selection corresponding to the online identity assigned the highest rank. The rank assignment for each online identity typically is stored as an online identity-level preference. As another alternative, the conflict resolution algorithm may include processing the call in accordance with a ranking of the option selections. For example, the option selections may be ranked according to how responsive the option selections are to the call, such that an option selection that forwards the call to another number would be selected over an option selection that sends a message asking the caller to call back.

If only one user selects to take the call or if no users select to take the call, the ICWCCPS 140 processes the received option selections by sending a call handling instruction to the telephone network 130 and/or sending an audio message to the caller phone 110 over the telephone network 130. The ICWCCPS 140 is configured to record, store, access, and play or redirect audio messages. The audio messages may be personalized by subscribers to the intelligent call waiting services and may be stored in a data store and indexed, for example, by direct number of the subscriber call destination phone. The ICWCCPS 140 also may generate and send an updated call notification message to the call destination computer systems 165, 170 of the remaining users (i.e., the users that did not submit the option selection that disposed of the call). The updated call notification message indicates the call disposition (e.g., "the call is being forwarded to cell number 410-999-9999"). The updated call notification message also may indicate the identity of the user (e.g., name or online identity) whose option selection controlled the disposition of the call (e.g., "John selected to forward the call to cell number 410-999-9999").

If more than one user selects to take the call, the ICWCCPS 140 processes the received option selections by generating and sending a conference call invitation to the call destination computer systems 165, 170 of the users that have chosen to take the call. In some implementations, the ICWCCPS 140 also sends conference call invitations to the call destination computer systems 165, 170 of one or more of the other users that received a call notification message but did not select any option or did not select an option to take the call. In these implementations, the ICWCCPS 140 typically replaces the call notification messages with conference call invitations. The ICWCCPS 140 also may generate and send an updated call notification message to the call destination computer systems 165, 170 of the users that were sent a conference call invitation. The updated call notification message indicates that the incoming call is being handled by launching a conference call (e.g., "The call is being answered and may be converted into a conference call"). The updated call notification message also may indicate which users selected to take the call (e.g., "John and Tom wish to answer the call. A conference call may be launched.").

While the above implementation presupposes that a conference call is launched only if more than one user selects to take the call in response to a call notification message, in another implementation, a conference call may be initiated even if only one user selects to take the call in response to a call notification message. As discussed below, in this implementation, when the first user selects to take the call, a two-person call is setup between the first user and the caller, and conference call invitations are sent out to the one or more remaining users. The conference call invitations typically replace the call notification messages. One or more of the remaining users may then select an option in the conference call invitation to join the call in progress, thereby converting the two-person call into a conference call.

A conference call invitation typically includes the online identity of the caller (determined based on, for example, Automatic Number Identification (ANI) information), and a set of options that may be selected by a potential participant to indicate whether and how the potential participant will participate in the conference call and, in some implementations, how the user wishes to connect to the ICWCCPS 140 (e.g., via a traditional telephone over the telephone network 130 or via a data telephone or computer over the data network 150). In another implementation, the online identity-level call waiting preferences may additionally include instructions regarding how the conference call invitation sent to an online identity should be formatted and what options should appear in the conference call invitation (i.e., conference call invitation preferences). The online identity-level call waiting preferences also may include message delivery preferences for the conference call invitation (which may be the same as or different from the message delivery preferences for the call notification message).

The ICWCCPS 140 is configured to receive over the data network 150 and through the online service provider system(s) 160 the conference call options selected by the potential participants and may receive the conference call option selections at different times dependent on the time it takes for each potential participant to select from among the conference call options presented in the conference call invitation. After the ICWCCPS 140 receives conference call option selections from all of the potential participants or, additionally or alternatively, after a predetermined interval of time (e.g., 2 minutes), the ICWCCPS 140 processes the conference call option selections.

When the ICWCCPS 140 receives a conference call option selection from a potential participant, the ICWCCPS 140 may send an updated conference call invitation to each call destination computer system 165, 170 associated with a potential participant (i.e., to the call destination computer systems 165, 170 that received conference call invitations). The updated conference call invitation may, for example, add a status section to the conference call option selection window of the conference call invitation or, alternatively, add another window that visually displays the conference call participation option selected by each potential participant. As each conference call option selection is received by the ICWCCPS 140, another updated conference call invitation is sent to each call destination computer system 165, 170 associated with a potential participant. All of the potential participants (including those that have already chosen a conference call participation option) are able to see in the status section or window the responses already submitted by the other potential participants. If a potential participant has inputted a reason or message in response to, for example, selecting the option to not participate in the call, the updated conference call option selection window may display that message for all of the potential participants to see. FIG. 6 shows an example of a user interface 600 including a conference call participant status window.

The ICWCCPS 140 processes the conference call connection options to establish bi-directional voice communication connections with the potential participants. If a potential participant has selected to connect to the conference call over the telephone network 130 using a traditional telephone connection, the ICWCCPS 140 identifies a direct number of a telephone associated with the user online identity of the potential participant and uses the direct number to place an outbound telephone call to the call destination telephone 115, 120. If the direct number of the call destination telephone associated with the user online identity is busy or not answered, the ICWCCPS is configured to send an error message to the call destination computer system 165, 170 associated with that user. If a potential participant has selected to connect to the conference call over the data network 150 using the call destination computer system 165, 170, the ICWCCPS 140 employs a telephony gateway to establish a bi-directional audio channel between the telephony gateway and the call destination computer system 165, 170 over the data network 150. The telephony gateway may be, for example, an Internet telephony gateway using a voice-over-IP communications protocol.

When the call destination telephones 115, 120 and/or call destination computer systems 165, 170 are connected to the ICWCCPS 140 for voice communications, the ICWCCPS 140 initiates a conference call in accordance with the conference call participation options selected by each participant. For example, if a potential participant desires to be a listener, the ICWCCPS 140 changes the bi-directional voice path or audio channel to a unidirectional voice path or audio channel. The unidirectional voice path or audio channel allows the potential participant to receive audio data and thus listen to the conference call but does not allow the potential participant to send audio data and thus contribute vocally to the conference call.

In another implementation, the ICWCCPS 140 does not wait a predetermined interval of time to receive option selections from call recipients in response to a call notification message (e.g., operations 310 and 312 of process 300 discussed below). Rather, as soon as the ICWCCPS 140 receives an option selection from a user that corresponds to taking the call in response to the call notification message, the ICWCCPS initiates a two-person call between the caller and the user that selected to take the call. The ICWCCPS 140 then sends conference call invitations (or updated conference call invitations) to one or more of the other users informing them that a call is in progress, informing them of the identity of the call recipient and caller that are participating in the call, and asking them whether they wish to join the call in progress. In this implementation, the conference call invitations (or updated conference call invitations) replace the updated call notification messages that typically are sent to the other users upon disposition of the call. The other users may then request to join the call in progress by responding to the conference call invitation.

The two-person call may be a call that is established through the ICWCCPS 140. In other words, the ICWCCPS 140 may set up the two-person call by setting up bidirectional voice communications connections between the caller and the ICWCCPS 140 and between the first user to select to take the call and the ICWCCPS 140 and then bridging the bidirectional voice communications connections with each other at the ICWCCPS 140. If one or more other users request to join the call in progress, the ICWCCPS 140 may convert the two-person call into a conference call by dynamically establishing a bidirectional voice communications connection between the ICWCCPS 140 and each user as each user selects to join the call in progress.

Alternatively, the two person call may be established by a direct bidirectional voice communications connection between the caller and the user that selected to take the call. The ICWCCPS 140, however, monitors the call in progress through a signaling channel with the telephone network 130 and directs the telephone network 130 to setup a multi-person or conference call if one or more other users request to join the call in progress. Setting up the multi-person or conference call may include instructing the telephone network 130 to end the bidirectional communications connection between the caller and the user that first selected to take the call, informing the caller and the user that first selected to take the call that another individual wishes to join the call and that a conference call is being launched, and establishing bidirectional voice communications connections between the caller and the ICWCCPS 140, between the first user to select to take the call and the ICWCCPS 140, and between the user that selected to join the call in progress and the ICWCCPS 140. The ICWCCPS 140 then initiates the conference call by bridging the connections. Additional users may then be added by dynamically establishing a bidirectional voice communications connection between the ICWCCPS 140 and each user as each user selects to join the call in progress.

In another implementation, to avoid screen clutter, the ICWCCPS 140 or the call destination computer systems 165, 170 may automatically close call notification message windows provided on the user interface of a call destination computer system 165, 170 after disposition of the call or after a predetermined interval of time (e.g., 15 seconds). The updated call notification message windows also may be closed automatically after a predetermined interval of time (e.g., 15 seconds). If a conference call invitation is received by the call destination computer system 165, 170, the conference call invitation window may replace the call notification message window. The conference call invitation window may close when the user selects a conference call option, when the conference call is initiated, or after a predetermined interval of time. The network 150 is configured to enable direct or indirect communications between the ICWCCPS 140, the online service provider system 160, and one or more call destination computer systems 165, 170. Examples of the network 150 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the network 150 and the telephone network 130 are implemented by a single or otherwise integrated communications network configured to enable voice communications between the caller phone 110, the first call destination phone 115, the second call destination phone 120, and the ICWCCPS 140, and to enable communications between the ICWCCPS 140, the online service provider system 160, and the one or more call destination computer systems 165, 170.

The online service provider system 160 is a computer system configured to provide online data communications services to users, detect online presence of users of call destination computer systems 165, 170, receive call notification messages and conference call invitations from the ICWCCPS 140, generate format data and send the format data along with the call notification messages and conference call invitations to call destination computer systems 165, 170, and send option selections from the call destination computer systems 165, 170 to the ICWCCPS 140. The online data communications services may include for example, e-mail services, instant messaging services, Internet access, and/or access to online content.

The online service provider system 160 may, for example, detect online presence of users of call destination computer systems 170 in a manner similar to that used to detect presence in an Instant Messaging system and/or in a manner similar to that disclosed in application Ser. No. 10/414,167, hereby incorporated by reference in its entirety (in which client-side communication device monitors are used). The online service provider system 160 also is configured to receive call notification messages and conference call invitations from the ICWCCPS 140, generate format data that is used to format the call notification message and conference call invitation for presentation on the call destination computer systems 170, and send the call notification messages and conference call invitations to the call destination computer systems 170 in real time.

The format data may vary based on device type. For example, with limited capabilities, the format data for a PDA may enable the PDA to limit the call notification message to a visual indication of the incoming call (e.g., illumination of a light and a graphical display of a call icon and the caller phone direct number or online identity proxy thereof) and may further limit the call handling options that are presented to the user to a subset of the full suite of options (e.g., the option to forward the call to one other phone number, the option to take the call, and the option to participate or not participate in a conference call). In contrast, the format data sent to a home computer may enable the home computer to provide, for example, an audio and visual indication of the call and to display full caller online identity information including address, return phone number, and other information about the caller accessible based on the caller phone number. The format data sent to the home computer also may enable the home computer to present to the user a significantly larger number of call handling options (e.g., the option to play various audio messages, take a message, and forward the call to a phone number selected by the user from a large number of possible phone numbers, to actively participate in a conference call, to listen in on a conference call, to connect over the telephone network or over the data network, and to send audio or text messages to other conference call participants). The format data for conference call invitations also may vary based on device type such that the presentation and option selections of a conference call invitation may change in accordance with the capabilities of the receiving communication device.

The online service provider system 160 also is configured to transmit in real time the option selections from the call destination computer systems 165, 170 to the ICWCCPS 140. Since the caller is waiting on the caller phone 110 during the generation and transmission of call notification messages and conference call invitations, the selection of options by users of call destination computer systems 165, 170, and the transmission processing of corresponding option selections, the online service provider system 160 is configured to send information to and receive information from the call destination computer systems 165, 170 in real time. Accordingly, the online service provider system 160 may be configured to avoid queuing call notification messages, option selections, conference call invitations, or conference call option selections to avoid further processing the call notification messages, option selections, conference call invitations, or conference call option selections in any way that increases transmission delay. The online service provider system 160 may be configured to provide this functionality in a manner similar to that used by instant messaging systems, or even to leverage instant messaging systems to enable transmission and receipt of instant messages in real time.

The call destination computer system 165, 170 is configured to receive call notification messages, conference call invitations, and format data from the online service provider system 160, process the call notification messages and conference call invitations in accordance with the format data to enable a user to perceive the call notification or conference call options, accept user selection of one of the options offered by the call notification message or offered by the conference call invitations, and send the option selection or conference call option selection to the online service provider system 160. The call destination computer system 165, 170 includes a device 165A, 170A capable of executing instructions under the command of a controller 165B, 170B. The device 165A, 170A may be a general purpose computer, such as a workstation or a personal computer, a PDA, a special purpose computer, an intelligent mobile phone, a pager, or a set top box.

The controller 165B, 170B commands and directs communications between the device 165A, 170A of the call destination computer system 165, 170 and the online service provider system 160. The controller 165B, 170B may include one or more software or hardware applications that enable digital communications to be received from the online service provider system 160. For example, the controller 165B, 170B may be a modified instant messaging application configured to receive notification messages and send option selections in a manner similar to that used to receive instant messages and send instant messages. The device 165A, 170A is connected to the controller 165B, 170B by a wired, wireless or virtual (i.e., when the controller is software running on the device) data pathway 165C, 170C capable of delivering data.

Figure 2:
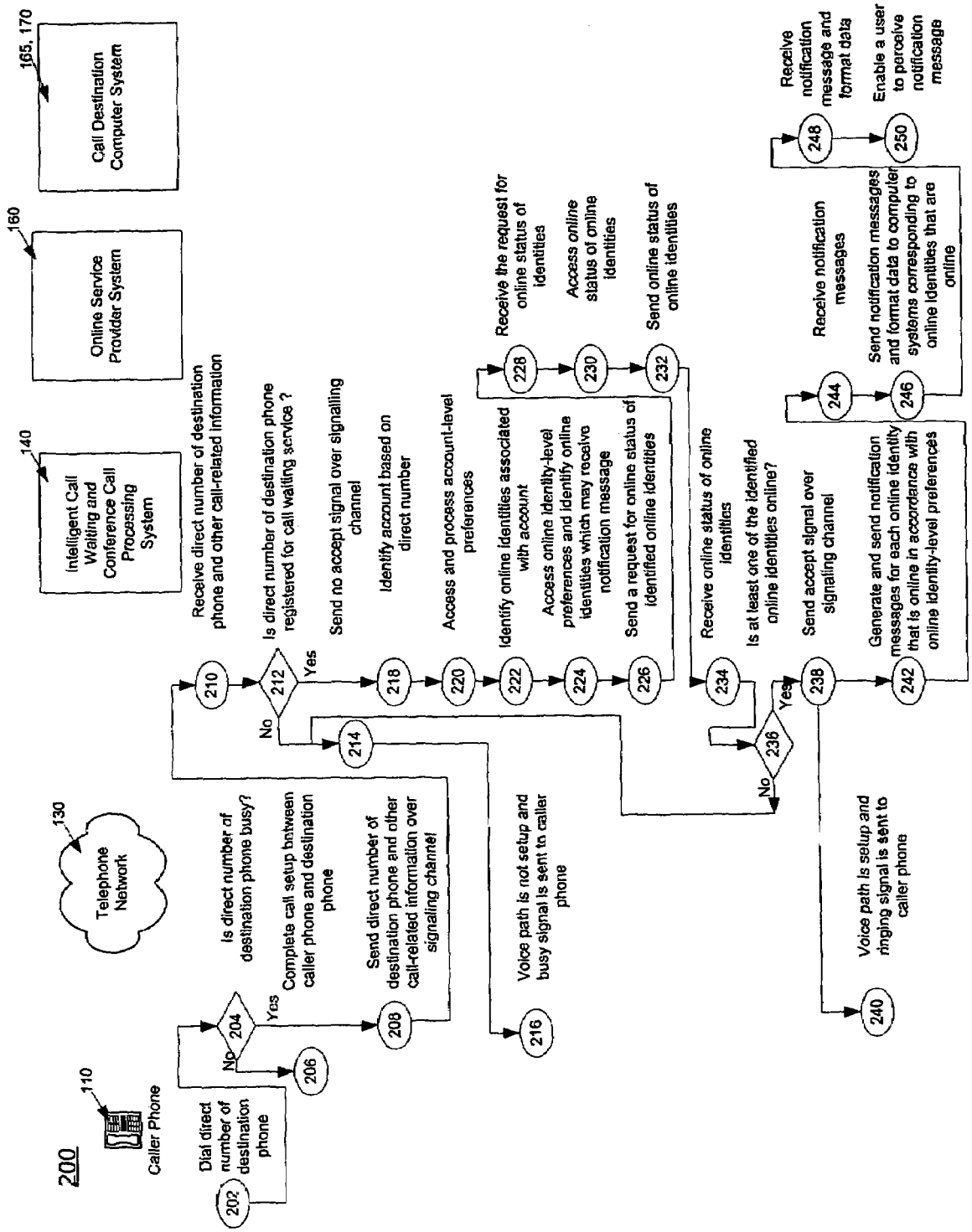
FIG. 2 is a flow chart illustrating a process for generating and delivering call notification messages.

FIG. 2 shows a process 200 for generating and delivering call notification messages. For convenience, particular components described with respect to FIG. 1 are referenced as performing the process 200. However, similar methodologies may be applied in other implementations where different components are used to define the structure of the system, or where the functionality is distributed differently among the components shown by FIG. 1. The process 200 is directed to generating and delivering call notification messages when the direct number of the first call destination phone 115 is busy. However, a call notification message may additionally or alternatively be generated and delivered under various other conditions. For example, the call notification message may be generated and delivered when the call to the direct number of the first call destination phone 115 is not answered after a predetermined number of rings, or, alternatively, the call notification message may be generated and delivered every time a call is directed to the direct number of the first call destination phone 115, regardless of the phone line status.

The user of the caller phone 110 dials the direct number of the first call destination phone 115 (202). The telephone network 130 determines whether the direct number of the first call destination phone 115 is busy (204). If the direct number of the first call destination phone 115 is not busy, the telephone network 130 completes the call setup between the caller phone 110 and the first call destination phone 115 (206).

If the direct number of the first call destination phone 115 is busy, the telephone network 130 sends the call destination phone direct number and other call-related information over a signaling channel to the ICWCCPS 140 (208). The ICWCCPS 140 receives the direct number of the first call destination phone 115 and the other call-related information (210) and determines whether the direct number of the first call destination phone 115 is registered for the call waiting service (212). The ICWCCPS 140 may determine whether a direct number is registered for the call waiting service by accessing, for example, a registration data store indexed by phone numbers and storing records for those direct numbers that are receiving the call handling service.

If the direct number of the first call destination phone 115 is not registered for the call handling service, the ICWCCPS 140 sends a "no accept" signal over the signaling channel to the telephone network 130 (214). In response to the no accept signal, the telephone network 130 sends a busy signal to the caller phone 110 and does not setup a voice path between the caller phone 110 and the ICWCCPS 140 (216). In another implementation, the ICWCCPS 140 instructs the telephone network 130 to redirect the voice path to a direct number corresponding to a voice messaging or voice mail system rather than instructing the telephone network 130 to send a busy signal.

If the direct number of the first call destination phone 115 is registered for call handling service, the ICWCCPS 140 identifies an account based on the direct number of the first call destination phone 115 (218) and accesses and processes account-level preferences (e.g., account-level white and/or black lists) (220). The account may be identified, for example, by accessing an account record stored in a configuration or registration data store and indexed by direct number of first call destination phone 115. The account-level preferences also may be stored in the account record. For example, the "Smith" account may be stored in the configuration data store under 703-123-4567 and may include the user online identities "JillSmith2" and "JoeSmith3". Operation 218 may be performed prior to operation 212 to enable a determination of whether call waiting is associated with an account rather than with a phone number.

FIG. 2 does not show the operations that take place if the call is disposed of by applying account-level preferences. In particular, if the call is disposed of by applying account-level preferences, the call is typically automatically blocked or forwarded to another number. If the call is not disposed of by applying the account-level preferences (e.g., the direct number of the caller phone 110 is not on a white list or a black list), the ICWCCPS 140 identifies online identities associated with the account (222) and accesses online identity-level preferences (e.g., online identity-level white and/or black lists) (224). In one implementation, the online identities associated with an account are stored in an account record while the online identity-level preferences are stored in online identity records associated with the account record. In another implementation, the online identities and the online identity-level preferences are stored in an account record.

The ICWCCPS 140 determines which online identities may be able to receive a call notification message based on the online identity-level preferences (e.g., the direct number of the caller phone 110 may be on the prohibited list of some of the online identities or parental controls may prohibit some of the online identities from receiving a call notification message) (224). The ICWCCPS 140 then sends a request to the online service provider system 160 for the online status of the available online identities (226).

The online service provider system 160 receives the request for the online status of the available online identities (228) and accesses the online status of the available online identities (230). The online status of the online identities may be stored, for example, in a presence data store that is regularly updated in real-time in a manner similar to that used in instant messaging systems to reflect activity of a user at the call destination computer system 170. The online service provider system 160 sends the online status of the available online identities to the ICWCCPS 140 (232).

The ICWCCPS 140 receives the online status of the available online identities (234) and determines whether at least one identified online identity is online (236). If no identified online identities are online, process 200 proceeds to operation 214. If at least one identified online identity is online, the ICWCCPS 140 sends an accept signal over the signaling channel to the telephone network 130 (238). In response to the accept signal, the telephone network 130 may send a ringing signal to the caller phone 110 and sets up a communications (e.g., voice) path with the caller phone 110 (240).

The ICWCCPS 140 generates and sends a call notification message in accordance with online identity-level preferences for each identified online identity that is online (242). The ICWCCPS 140 sends the call notification messages for each identified online identity that is online to the online service provider system 160. The call notification messages typically are sent out in parallel by the ICWCCPS 140 to minimize transmission delays and the arrival time difference between call destination computer systems 165, 170.

The online service provider system 160 receives the call notification messages for each identified online identity that is online (244) and sends the call notification messages along with format data to call destination computer systems 165, 170 corresponding to the online identities (246). The receiving of the call notification messages and sending of the call notification messages and format data is performed in real time. The call notification messages typically are sent out in parallel by the online service provider system 160 to minimize transmission delays and the arrival time difference between call destination computer systems 165, 170. In another implementation, operations 234-246 may be implemented by the online service provider system 160, rather than by the ICWCCPS 140. In this implementation, the online service provider system 160 is configured to store and/or access the online identity-level preferences.

Each call destination computer system 165, 170 receives the call notification message and format data (248) and enables a user to perceive the call notification message (250). In one implementation, the call destination computer system 165, 170 enables the user to perceive the call notification message as a pop-up window or dialog box that appears on a visual display of the call destination computer system 165, 170.

Figure 3A:
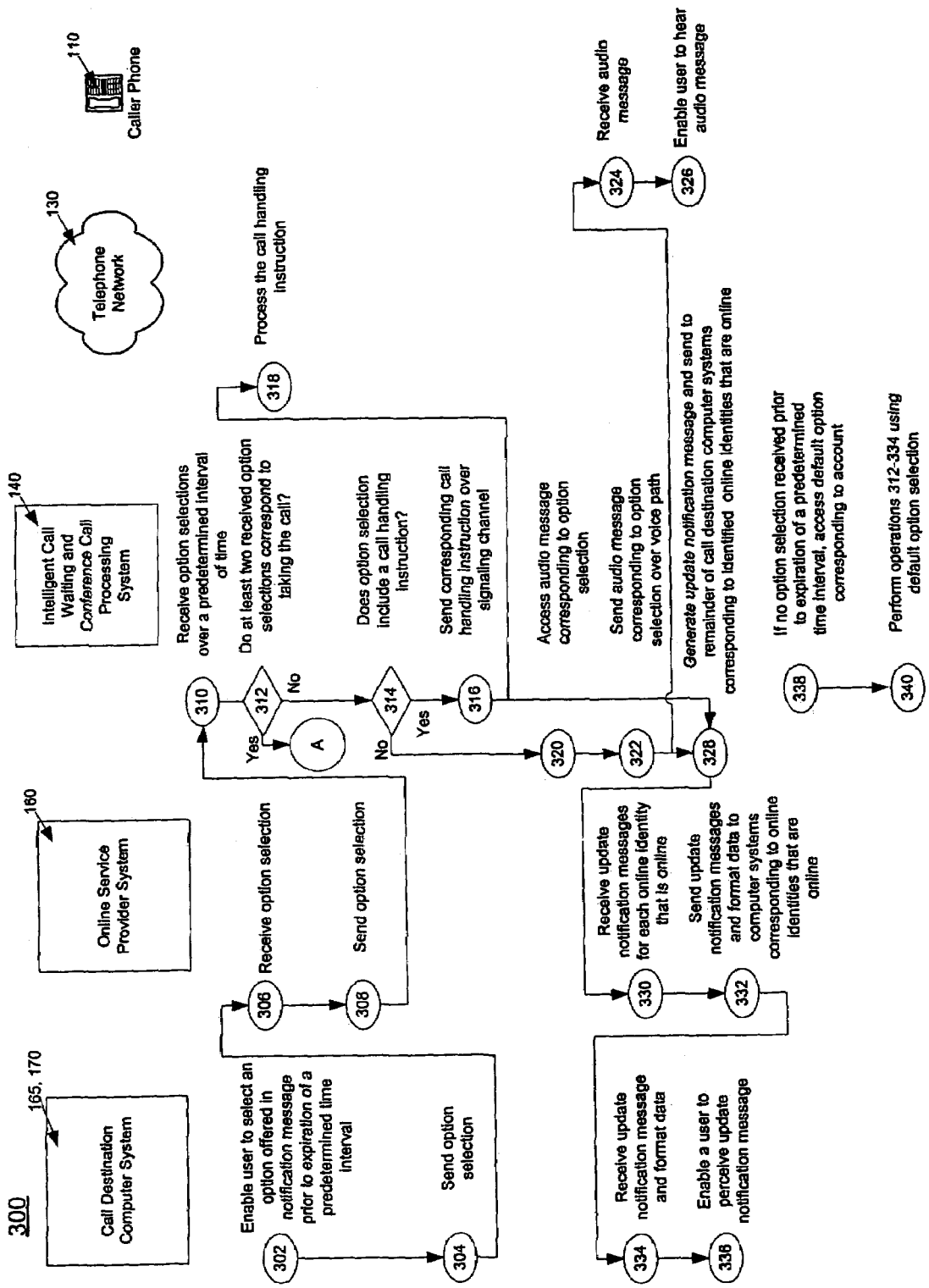
FIGS. 3A, 3B, and 3C are flow charts illustrating a process for responding to a user selection of an option in a call notification message.
Figure 3B:
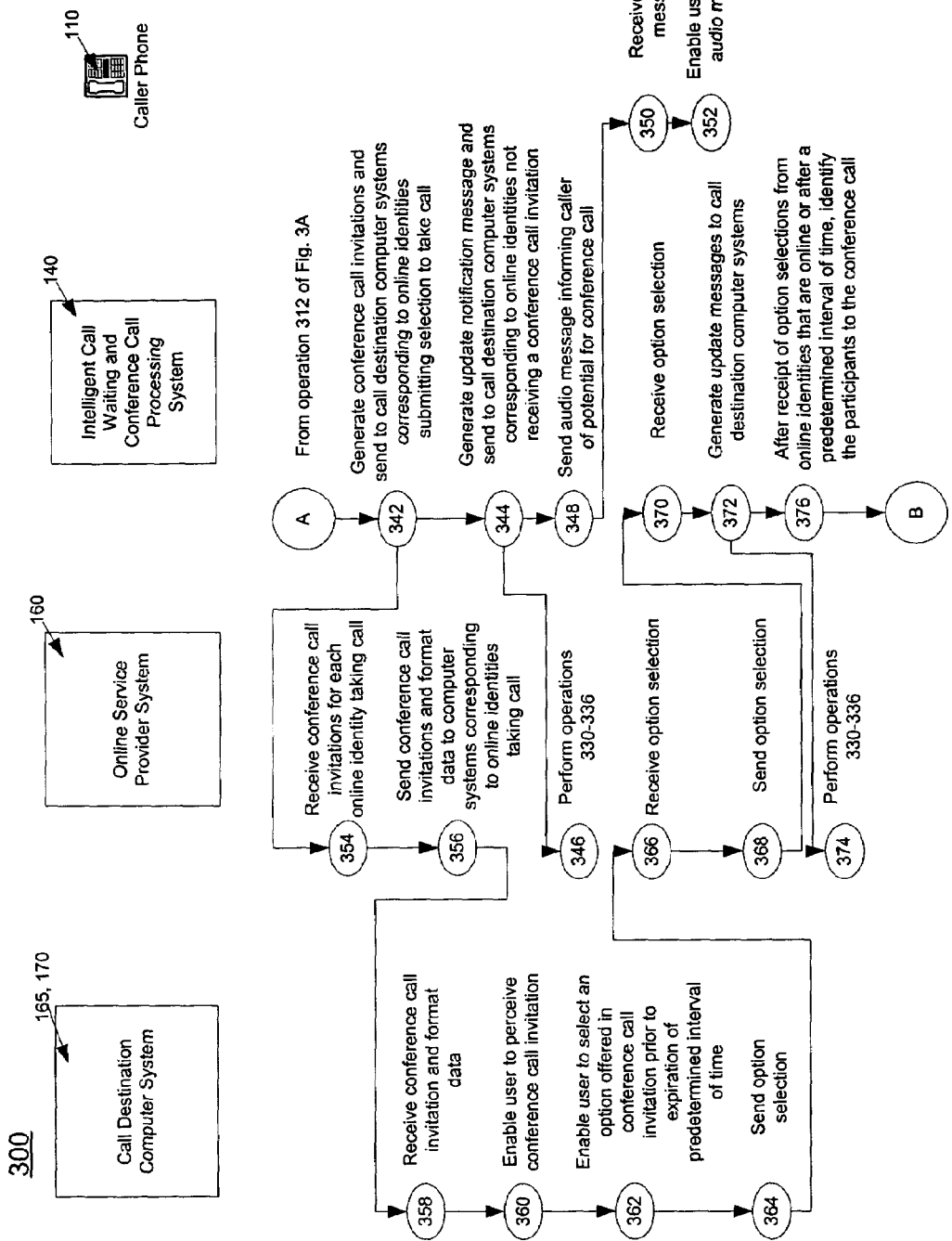
Figure 3C:
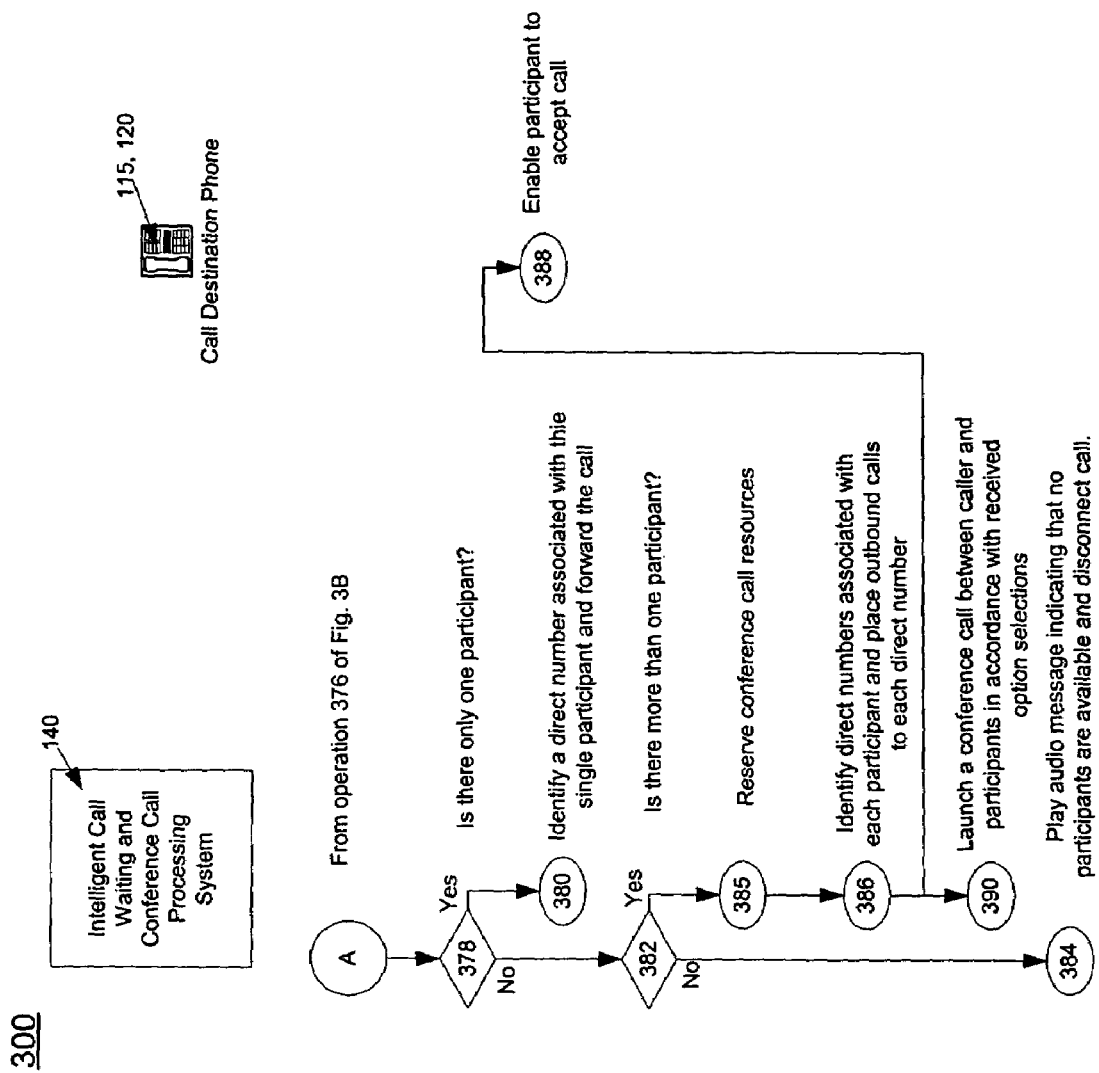

FIGS. 3A-3C show a process 300 for responding to a user selection of an option in a call notification message. For ease of discussion, particular components described with respect to FIG. 1 are referenced as performing the process 300. However, similar methodologies may be applied in other implementations where different components are used to define the structure of the system, or where the functionality is distributed differently among the components shown by FIG. 1.

The call destination computer system 170 enables a user to select an option offered in the call notification message prior to expiration of a predetermined time interval (e.g., 15 seconds) (302). The call destination computer system 170 sends the option selection to the online service provider system 160 (304).

The online service provider system 160 receives the option selection (306) and sends the option selection to the ICWCCPS 140 (308), and does so in real time.

The ICWCCPS 140 receives the option selection (310). The process 300 employs a rank-based conflict resolution algorithm. The ICWCCPS 140 waits for a predetermined interval of time (e.g., 15 seconds) to receive option selections from multiple call destination computers 165, 170, and selects one of the received options selections in accordance with the rank-based conflict resolution algorithm. The ranks may be assigned by user online identity (i.e., some user online identities have a higher rank than other user online identities and, accordingly, their option selections take precedence over the option selections received from user online identities having a lower rank) or by level of responsiveness to the call (i.e., an option to take the call takes precedence over an option to send an audio message prior to disconnecting the call). Process 300, however, assumes that if two option selections are received that correspond to taking the call, a conference call may be launched irrespective of the ranks assigned to user online identities or to option selections.

After a predetermined interval of time or after having received option selections from all user online identities, the ICWCCPS 140 determines whether at least two of the received option selections correspond to taking the call (312). If two or more received option selections correspond to taking the call, the process 300 proceeds to operation 342 to initiate a conference call. In another implementation, a conference call may be initiated, even if only one user selects to take the call in response to a call notification message and without waiting a predetermined interval of time to receive option selections. As discussed previously, in this implementation, upon the first user selecting to take the call, a two-person call is setup between the first user and the caller and conference call invitations are sent out to the one or more remaining users. One or more of the remaining users may then select an option in the conference call invitation to join the call in progress, thereby converting the two-person call into a conference call.

If one or none of the received option selections during the predetermined interval of time correspond to taking the call, the ICWCCPS 140 selects one of the received option selections in accordance with the rank-based conflict resolution algorithm. The ICWCCPS 140 determines whether the option selection includes a call handling instruction (i.e., an instruction to forward or ignore the call) (314). If the option selection includes a call handling instruction, the ICWCCPS 140 sends the call handling instruction to the telephone network 130 over the signaling channel (316). The telephone network 130 processes the call handling instruction and, if necessary, forwards or redirects the voice path accordingly (318). In some implementations, the ICWCCPS 140 accesses and sends an audio message over the voice path to the caller phone 110 prior to sending the call handling instruction to the telephone network 130 (e.g., the audio message "The phone you are calling is busy. Please stay on the line and you will be transferred to an alternative number." May be sent prior to sending the call handling instruction to forward the call).

If the option selection does not correspond to a call handling instruction, then the ICWCCPS 140 accesses an audio message corresponding to the option selection (320) and sends the audio message corresponding to the option selection over the voice path to the caller phone 110 (322). The caller phone 110 receives the audio message (324) and enables a user to hear the audio message (326).

After or contemporaneous with sending the call handling instruction to the telephone network 130 and/or sending an audio message to the caller phone 110, the ICWCCPS 140 generates an updated call notification message for each remaining identified online identity that is online (i.e., the identified identities that are online and whose option selection did not dispose of the call) and sends the updated call notification messages to the online service provider system 160 (328). The online service provider system 160 receives the updated call notification messages (330) and sends the updated call notification messages to the corresponding call destination computer systems 170 (332). In another implementation, the ICWCCPS 140 sends an updated call notification message only to a subset of the remaining identified online identities that are online. For example, an updated call notification message may not be sent to online identities that selected to ignore the call.

Each call destination computer system 165, 170 receives an updated call notification message (334) and enables a user to perceive the updated call notification message (336). In one implementation, the updated call notification message is presented to users as a dialog box or pop-up window that displays the option selection that was used for processing the call and the online identity that submitted that option selection, if applicable (i.e., an online identity is not shown if the call was processed in accordance with a default option selection as discussed below).

If the ICWCCPS 140 does not receive an option selection within a predetermined time interval from any of the call destination computer systems 165, 170 that received call notification messages (e.g., at 306), the ICWCCPS 140 automatically accesses a default option selection corresponding to the account (and stored as an account-level preference) (338). The ICWCCPS 140 processes the default option selection in accordance with operations 314-336 (340).

If two or more received option selections correspond to taking the call, the ICWCCPS 140 generates and sends conference call invitations addressed to the user online identities that selected to take the call (i.e., potential conference call participants) (342). The conference call invitations typically are sent out in parallel by the ICWCCPS 140 to minimize transmission delays and the arrival time difference between call destination computer systems 165, 170. The ICWCCPS 140 may generate the conference call invitations in accordance with format preferences stored for each online identity. The ICWCCPS 140 also generates and sends updated call notification messages to the user online identities that were not sent conference call invitations (344). The updated call notification messages are received and processed by the online service provider system 160 and the call destination computer systems 165, 170 in accordance with operations 330-336 (346). The updated call notification messages inform the users that a conference call has been launched and, additionally, may inform the users of the user online identities that chose to take the incoming call and that may participate in the conference call.

In another implementation, the updated call notification messages may include an additional option to join the conference call. If the additional option is selected by a user, that user may receive a conference call invitation and may partake in the conference call in the same manner as those that initially selected to take the incoming call in response to a call notification message. Alternatively, rather than sending updated call notification messages, the ICWCCPS 140 may send conference call invitations to provide all or a subset of the other users (i.e., not just the users that initially selected to take the call in response to a call notification message) with the option to join the conference call by selecting from the options offered by the conference call invitation.

The ICWCCPS 140 also sends an audio message to the caller phone 110 informing the caller that more than one user has selected to take the call and, therefore, a conference call may be launched (348). The caller phone 110 receives the audio message (350) and enables the user to perceive the audio message (352).

The online service provider system 160 receives the conference call invitations for each potential participant (354) and sends the conference call invitations along with format data to call destination computer systems 165, 170 corresponding to the potential participants (356). The receiving of the conference call invitations and sending of the conference call invitations and format data is performed in real time. The conference call invitations typically are sent out in parallel by the online service provider system 160 to minimize transmission delays and the arrival time difference between call destination computer systems 165, 170.

Each call destination computer system 165, 170 receives the conference call invitation and format data (358) and enables a user to perceive the conference call invitation (360). In one implementation, the call destination computer system 165, 170 enables users to perceive the conference call invitation as a pop-up window or dialog box that appears on a visual display of the call recipient computer system 165, 170. FIG. 5 shows an example of a user interface 500 depicting a conference call invitation. The call destination computer system 165, 170 enables a user to select an option offered in the conference call invitation prior to expiration of a predetermined time interval (e.g., two minutes) (362). The call destination computer system 165, 170 sends the conference call option selection to the online service provider system 160 (364).

The online service provider system 160 receives the conference call option selection (366) and sends the conference call option selection to the ICCPS 140 (368), and does so in real time. The ICWCCPS 140 receives the conference call option selection (370). The ICCPS 140 generates and sends an updated conference call invitation for each potential participant (or each remaining potential participant) and sends the updated conference call invitation to the online service provider system 160 (372). The online service provider system 160 and the call destination computer systems 165, 170 process the updated conference call invitations by performing operations 330-336 (374). In particularly, the online service provider system 160 receives the updated conference call invitations and sends the updated conference call invitations to the corresponding call destination computer systems 165, 170. In another implementation, the updated conference call invitations are not sent to call destination computer systems 165, 170 that correspond to identities that selected not to join the conference call.

Each call destination computer system 165, 170 receives an updated conference call invitation and enables a user to perceive the updated conference call invitation. In one implementation, the updated conference call invitation is presented to users as a dialog box or pop-up window that displays a status section visually displaying the conference call participation option selected by that potential call recipient and the options selected by any other potential call recipients that previously sent option selections to the ICWCCPS 140. The selected option is shown along with a user identifier corresponding to the potential call recipient from which the selected option was received. The status section also may include a message inputted by the potential participants in response to the conference call invitation. For example, the message may indicate why the potential participant has chosen not to participate in the conference call. FIG. 6 shows an example of a user interface 600 including a conference call participant status window.

In another implementation, the status presented in the updated conference call invitation does not identify specific potential participants but rather presents a total number of potential participants that have responded to the conference call invitation by sending an option selection and the total number of potential participants that have not responded. The total number of potential participants that have responded may further be subdivided into the number of potential participants that have chosen to participate actively, participate as a listener, and not participate.

In yet another implementation, the updated conference call invitation also may be sent to the caller that initiated the conference call. The updated conference call invitation may be sent to a caller computer system (not shown) having similar characteristics as the call recipient computer systems 165, 170 or, additionally or alternatively, the updated conference call invitation may be sent to the caller telephone 110 over the network 150 (i.e., this implementation assumes that the caller telephone 110 has data communication capabilities to receive and send data over the network 150) or, alternatively, may be sent as an audio message over the telephone network 130. The audio message may inform the caller of the current participation status of the potential call recipients.

If the ICWCCPS 140 does not receive an option selection within a predetermined time interval from any of the call destination computer systems 165, 170 that received conference call invitations (e.g., at 358), the ICWCCPS 140 stops accepting option selections and identifies the participants to the conference call based on the already received option selections (376). The ICWCCPS 140 identifies the participants by analyzing the conference call participation option selections received from the potential participants.

The ICWCCPS 140 determines whether only one potential participant desires to participate in the conference call (378). If only one potential participant desires to participate in the conference call, the ICCPS 140 sends an audio message to the caller telephone 110 informing the caller that only one potential participant wishes to join and that the call will be forwarded to the potential participant. If the conference call connection options associated with that potential participant indicate that the potential participant wishes to use the call destination telephone 115, 120 to connect to the conference call over the telephone network 130, the ICWCCPS 140 forwards the call to the corresponding call destination telephone 115, 120 by providing the telephone network 130 with the appropriate signaling information (380). If the conference call connection options associated with that potential participant indicate that the potential participant wishes to use the call destination computer system 165, 170 to connect to the conference call over the data network 140, the ICWCCPS 140 establishes a bidirectional audio channel with the call destination computer system 165, 170 and employs a telephony gateway to enable communication exchanges between the caller telephone 110 and the call destination computer system 165, 170 (not shown).

The ICWCCPS 140 determines whether more than one potential participant wishes to participate in the conference call (382). If more than one potential participant wishes to participate in the conference call, the ICWCCPS 140 reserves conference call resources (385) (e.g., reserves physical or virtual communication ports) and establishes a bi-directional (or unidirectional, if the potential call participant decides to listen to rather than to actively participate in the conference call) voice communications connection with each potential participant in accordance with their conference call connection option selection. Accordingly, for a potential participant that wishes to establish a communications connection over the telephone network 130 using the call recipient telephone 115, 120, the ICWCCPS 140 identifies a direct number associated with the potential participant and uses the direct number to place an outbound call to the corresponding call destination telephone 115, 120 (386). When the call recipient accepts the call, the communications connection is setup (388). If the call recipient does not accept the call or is otherwise unavailable to receive the call (e.g., the line is busy), the ICWCCPS sends an error message to the corresponding call destination computer system 165, 170. For a potential call recipient that wishes to establish a communications connection over the data network 150 using the call recipient computer system 165, 170, the ICWCCPS 140 employs a telephony gateway to establish a bi-directional audio channel with the call destination computer system 165, 170 (not shown). Once all of the connections between the ICWCCPS 140 and the participants have been setup, the ICWCCPS 140 initiates the conference call (390).

In another implementation, the ICWCCPS 140 may launch the conference call as soon as the ICWCCPS 140 receives a conference call option selection from a user to join the call. The ICWCCPS 140 initiates the conference call by setting up a voice communications connection between the caller and the first call recipient that selected to join the call. The ICWCCPS 140 enables each subsequent call recipient to access the call while the call is in progress by setting up an associated voice communications connection upon each subsequent call recipient selecting to participate in the call.

If no potential call recipients select to join the conference call, the ICWCCPS 140 sends an audio message to the caller telephone 110 indicating that no participants wish to join in the conference call. After sending or playing the audio message, the ICWCCPS 140 disconnects the call (384).

Figure 4:
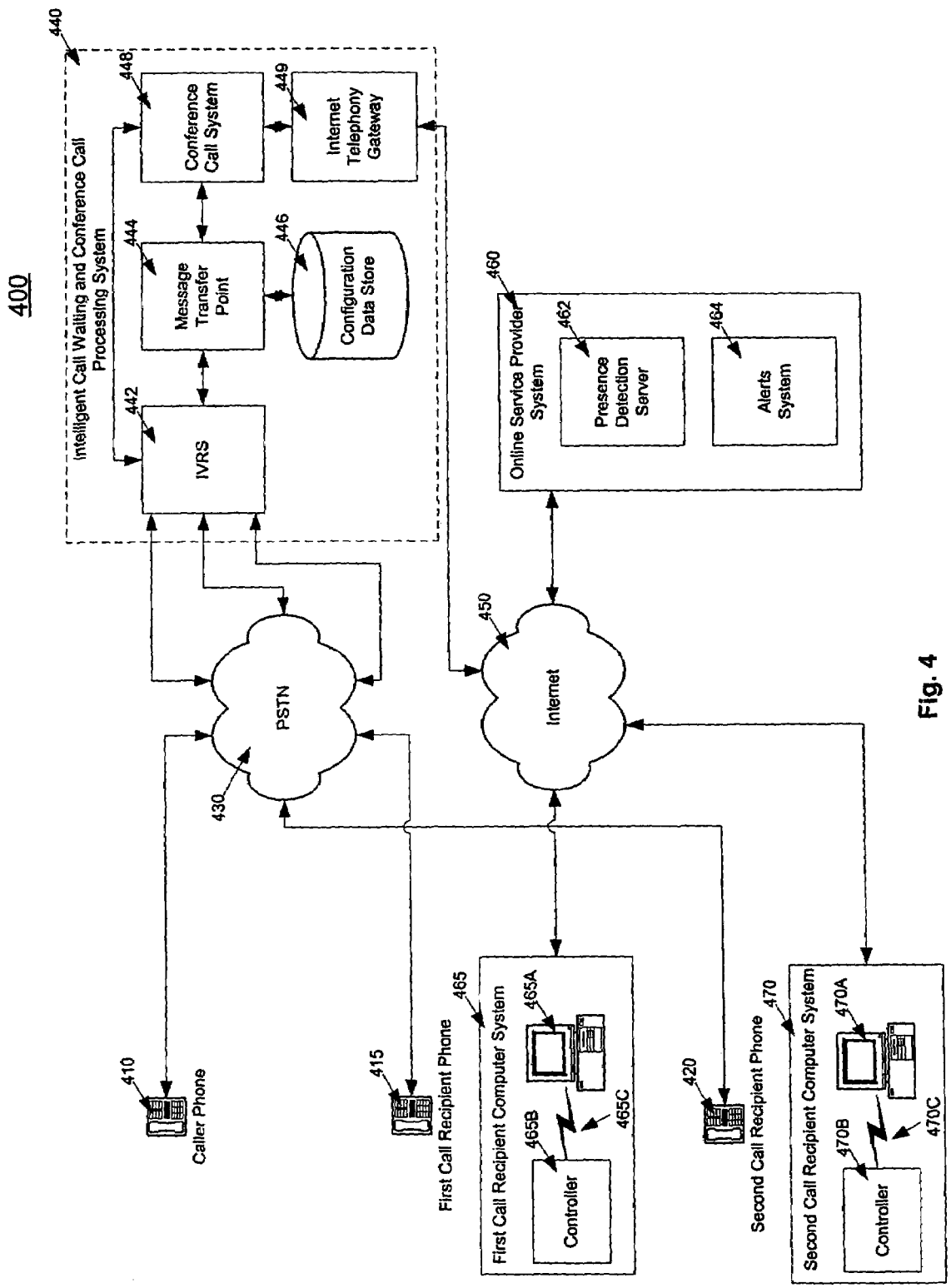
FIG. 4 is block diagram of an exemplary implementation of the communications system of FIG. 1 used for providing multi-user intelligent call waiting with conference call functionality.

FIG. 4 shows one exemplary implementation 400 of the communications system 100 of FIG. 1 configured to provide multi-user intelligent call waiting with conference call functionality. The communications system 400 includes a caller phone 410, a first call destination phone 415, a second call destination phone 420, the PSTN 430, an ICWCCPS 440, the Internet 450, an online service provider system 460, a first call destination computer system 465, and a second call destination computer system 470. Each call destination computer system 465, 470 includes a device 465A, 470A that communicates with a controller 465B, 470B over a data pathway 465C, 470C. Examples of each element within the communications system 400 of FIG. 4 are described broadly above with respect to FIG. 1. In particular, the caller phone 410, the call destination phones 415 and 420, the PSTN 430, the Internet 450, and the call destination computer systems 465 and 470 typically have attributes comparable to those described with respect to the caller phone 110, the call destination phones 115 and 120, the telephone network 130, the network 150, and the call destination computer systems 165 and 170 of FIG. 1, respectively. Likewise, the ICWCCPS 440 and the online service provider system 460 typically have attributes comparable to and illustrate one possible implementation of the ICWCCPS 140 and the online service provider system 160 of FIG. 1. FIG. 4 shows two representative call destinations with associated telephones 115 and 120 and computer systems 165 and 170. The communications system 400, however, may include any number of call destinations.

The ICWCCPS 440 includes an interactive voice response system (IVRS) 442, a message transfer point 444, a configuration data store 446, a conference call system 448, and an Internet telephony gateway 449. The online service provider system 460 includes a presence server 462 and an alerts system 464.

The IVRS 442 is a telephony-facing computer system configured to send call handling instructions to the PSTN 430 and store, record, and send audio messages to the caller phone 410 through the PSTN 430. The call handling instructions include, for example, accepting a call, rejecting a call, and redirecting a call. The IVRS 442 also sends call-related information to the message transfer point 444 and receives instructions regarding which call handling instruction should be sent to the PSTN 430 and/or audio message should be accessed and sent through the PSTN 430.

The IVRS 442 may use the call-related information to validate the caller or, additionally or alternatively, may validate the caller by, for example, prompting the caller for a password and user online identity. The IVRS 442 may send the call-related information and, if applicable, the user online identity and password to the message transfer point 444. The message transfer point 444 may access the configuration data store 446 and validate the caller by verifying that the call-related information or user online identity and password match with that in an active subscriber record.

The IVRS 442 also may be configured to send the appropriate instructions to the PSTN 430 over a signaling channel to forward the call to a direct number of a call recipient telephone 415, 420 if the message transfer point 444 indicates that multiple users desire to take the call but only one potential participant agrees join the resulting conference call. If the message transfer point indicates that multiple users desire to take the call but no potential participants agree to join the resulting conference call, the WRS 442 may be configured to play an audio message to the caller indicating that no participants wish to join the conference call and may then disconnect the call.

The IVRS 442 is also configured to place one or more outbound calls to potential conference call participants if the message transfer point 444 indicates that multiple users desire to take the incoming call, multiple potential participants select to join the resulting conference call, and at least one of the potential participants wants to connect to the conference call over the PSTN 430. Once a potential participant accepts the outbound call, the IVRS 442 may transfer the voice path of the call over the PSTN 430 to the conference call system 448 via an intelligent transfer mechanism. The intelligent transfer mechanism may be, for example, Release Link Trunking or 2B-Channel Transfer. Alternatively, the IVRS 442 may internally connect the call to the conference call system 448 by setting up additional voice paths through the IVRS 442 to the conference call system 448.

The message transfer point 444 is an IP-facing computer system that performs various call management and data processing functions. These functions include validating a call received by the WRS 442, generating and sending call notification messages and conference call invitations to the alerts system 464, receiving option selections and conference call option selections from the alerts system 464, and sending instructions corresponding to the received option selections and conference call option selections to the IVRS 442. The message transfer point 444 accesses the configuration data store 446 to validate a call received by the IVRS 442 and to access account-level and online identity-level call waiting preferences. The message transfer point 444 also requests online status of online identities from the presence server 462 of the online service provider system 460.

The message transfer point 444 receives and processes the conference call participation option selections and the conference call connection option selections of the potential call recipients. If no participants desire to join the conference call, the message transfer point 444 instructs the IVRS 442 to send an audio message to the caller indicating that no participants wish to join the call. If only one participant desires to join the conference call and that participant has selected to join the conference call over the PSTN 430, the message transfer point 444 instructs the IVRS 442 to forward the call to the call destination telephone 415, 420 of the single willing participant (i.e., to the direct number associated with the single willing participant). If one or more participants desire to join the conference call and have selected to join the call over the Internet 450, the message transfer point 444 instructs the Internet telephony gateway 449 to establish a bi-directional audio channel with the call destination computer systems 465, 470 associated with each of the corresponding participants. If more than one participant desires to join the conference call and have selected to join the call over the PSTN 430, the message transfer point 444 instructs the IVRS 442 to place outbound calls to the call recipient telephones 415, 420 associated with the corresponding participants (i.e., to the direct numbers associated with the willing participants).

The message transfer point 444 also sends instructions to the conference call system 448 to setup the conference call. The instructions typically include the number of participants, the data indicating the level of participation of each participant (e.g., active participation or just listening), and identification information that allows the conference call system 448 to identify the connections through which each of the participants will participate in the conference call. In one implementation, the identification information includes the direct telephone numbers of the participants (e.g., the destination telephone number of the outbound calls placed by the IVRS 442 or the telephone number assigned to the participant by the Internet telephony gateway 449). The conference call system 448 may then identify the connection associated with that participant using, for example, DNIS. In another implementation, the identification information includes the channels or the trunk group through which the conference call system 448 receives the voice path associated with that participant. This implementation is typically used when the IVRS 442 internally connects the call associated with the participant to the conference call system 448 by setting up an additional voice path through the IVRS 442 to the conference call system 448.

The configuration data store 446 is a data storage device that is communicatively coupled to the message transfer point 444 and that includes account records and online identity records. The account records store account-level call waiting preferences and may be indexed by subscriber phone number (i.e., the direct number of the first call destination phone 415). The online identity records store online identity-level call waiting preferences, conference call invitation preferences, online identity level contact information (e.g., telephone numbers, e-mail addresses, and IP addresses for each user online identity), and other information related to establishing a bi-directional voice path with a user online identity across the PSTN 430 or the Internet 450 (e.g., IP address information). The online identity records may be indexed by account number, subscriber phone number, and/or user online identity.

Conference call invitation preferences are instructions typically specified by each user online identity that indicate how the conference call invitation sent to that user online identity should be formatted and what options should appear in the conference call invitation. The options may include call participation options and call connection options. The call participation options may include active participation, listener, no participation, and send audio or text message reply. The audio or text message reply is typically sent when the user does not wish to participate in the conference call and may include reasons for not participating. The audio or text message reply to the conference call invitation may be inputted dynamically by the user upon receipt of the conference call invitation or may be chosen from among a predetermined set of options (e.g., "Cannot participate due to other preexisting commitment," and "Sorry, but I am busy right now,"). The call connection options may include connecting to the conference call using a traditional telephone connection over the PSTN 430 using, for example, the call destination telephone 415, 420, or connecting to the conference call using the call destination computer system 465, 470 (e.g., which may be a data telephone) which may be configured to establish and communicate using a bi-directional audio channel over the Internet 450.

The conference call system 448 is a telephony-facing computer system configured to receive conference call setup instructions from the message transfer point 444 and initiate a conference call in accordance with the conference call setup instructions. The IVRS 442 sets up voice paths between the call destination telephones 415, 420 and the conference call system 448 for potential participants that choose to participate in the conference call over the PSTN 430. The Internet telephony gateway 449 sets up voice paths from the Internet telephony gateway 449 to the conference call system 448 for potential participants that choose to participate in the conference call over the Internet 450 using the call destination computer systems 465, 470. The conference call system 448 identifies the voice path connections of each potential participant based on the identification information included in the instructions received from the message transfer point 444. The conference call system 448 uses the identification information to establish a bi-directional audio bridge that connects the voice paths of the participants. If a participant is a listener, the conference call system may change the voice path to a unidirectional voice path.

The Internet telephony gateway 449 is a computer system configured to be a digital telephony interface that converts packets of encoded voice data received over the Internet 450 into audio sent over voice paths established between the Internet telephony gateway 449 and the conference call system 448. The Internet telephony gateway 449 may use a typical CODECs (e.g., G.711, G.723, or G.728) to encode and decode the packets of voice data. When a potential participant chooses the option to connect to the conference call over the Internet, the message transfer point 444 instructs the Internet telephony gateway 449 to establish a bi-directional audio channel (or, in some implementations, a unidirectional audio channel if the potential participant chooses to only listen to the conference call) with the call destination computer system 465, 470. The Internet telephony gateway 449 may communicate with the call destination computer system 465, 470 using, for example, a voice-over-IP communications protocol such as H.323 or SIP.

The Internet telephony gateway 449 also receives from the message transfer point 448 the telephone number or trunk group assigned to the potential participant. The Internet telephony gateway 449 may use the assigned telephone number or trunk group to establish a voice path for that potential participant from the Internet telephony gateway 449 to the conference call system 448. Packets of voice data received from that potential participant may then be decoded, converted to audio, and sent to the conference call system 448 over the appropriate voice path assigned to that potential participant. Similarly, audio received over the voice path assigned to the potential participant may be encoded and converted to voice data packets by the Internet telephony gateway 449 and then sent to the call destination computer system 465, 470 over the Internet 450. In another implementation, the Internet telephony gateway 449 and the conference call system 448 are implemented as a single or otherwise integrated system configured to handle connections over the Internet 450 and over the PSTN 430.

The presence server 462 is a server that receives, updates, and publishes online presence data for each online identity. The presence server 462 enables the message transfer point 444 to access online status data for particular online identities. In one implementation, the presence server 462 is functionally similar to the central server in an instant messaging system that receives periodic online status updates from call destination computer systems 470. In another implementation, the presence server 462 is functionally similar to the presence detection system disclosed in application Ser. No. 10/414,167 that receives communication device status data and user availability to perceive communications data from a device monitor coupled to the device 470B of the call destination computer system 470. In this implementation, the message transfer point 444 includes the functionality of a device monitoring system.

The alerts system 464 is a computer system configured to enable real time or near real time transmission of call notification messages to call destination computer systems 470 from the message transfer point 444 and transmission of the option selections from call destination computer systems 470 to the message transfer point 444. The alerts system 464 is configured to provide this functionality in a manner similar to that used by instant messaging systems to enable transmission and receipt of instant messages in real time. Such a system has been described, for example, in application Ser. No. 10/320,712, hereby incorporated by reference.

Figure 5A:
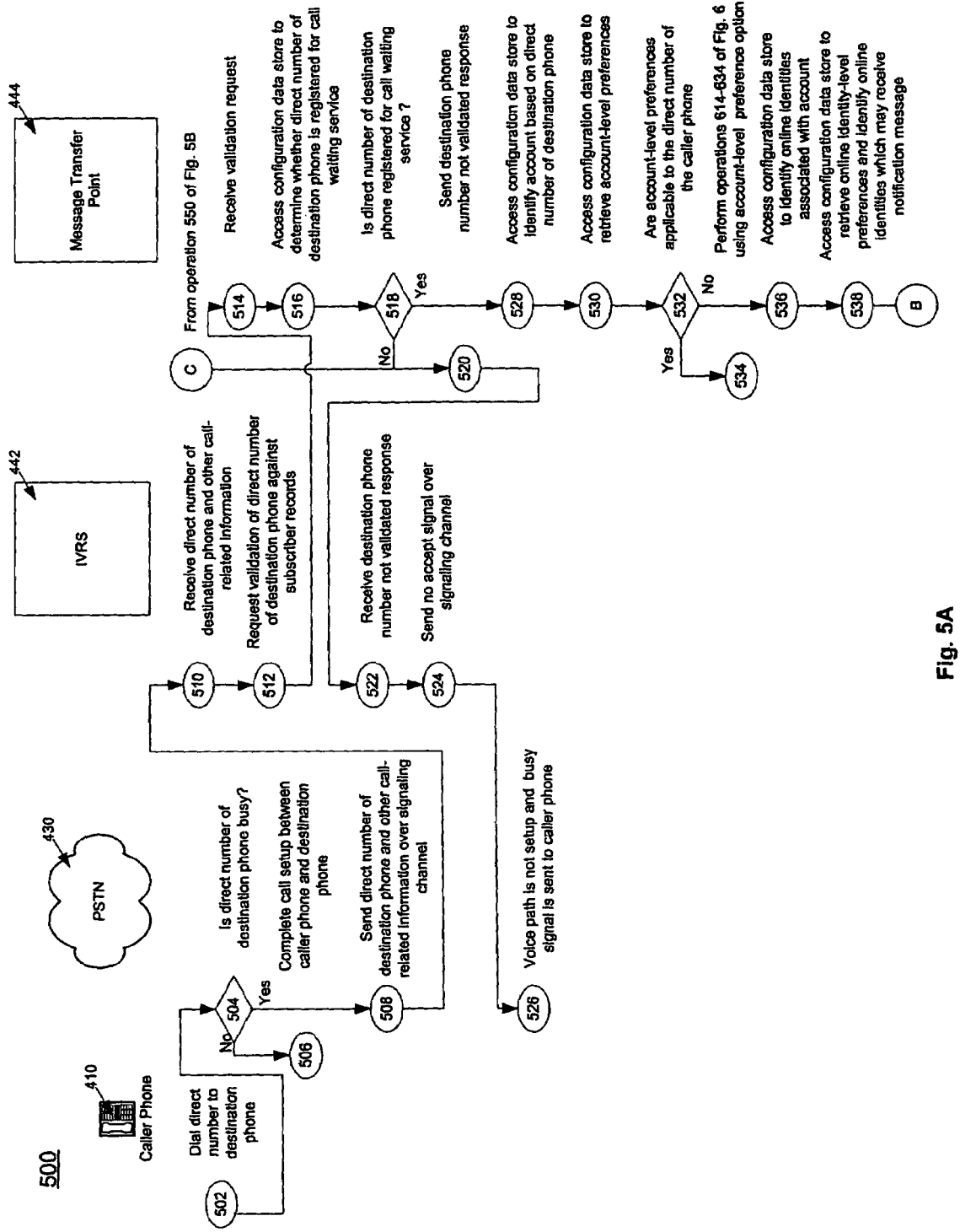
FIGS. 5A and 5B are flow charts illustrating a process for generating and delivering call notification messages.
Figure 5B:
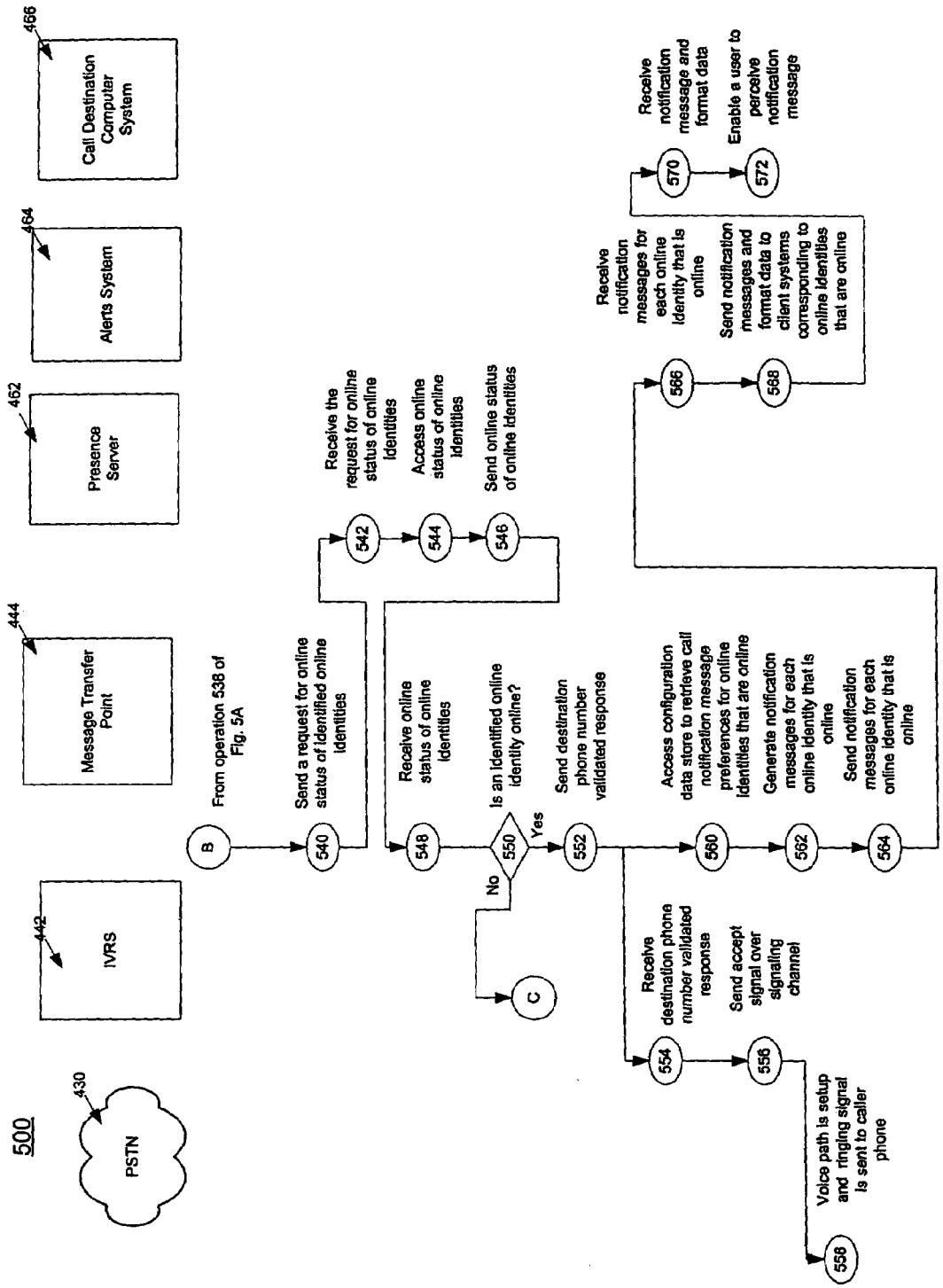
Figure 6A:
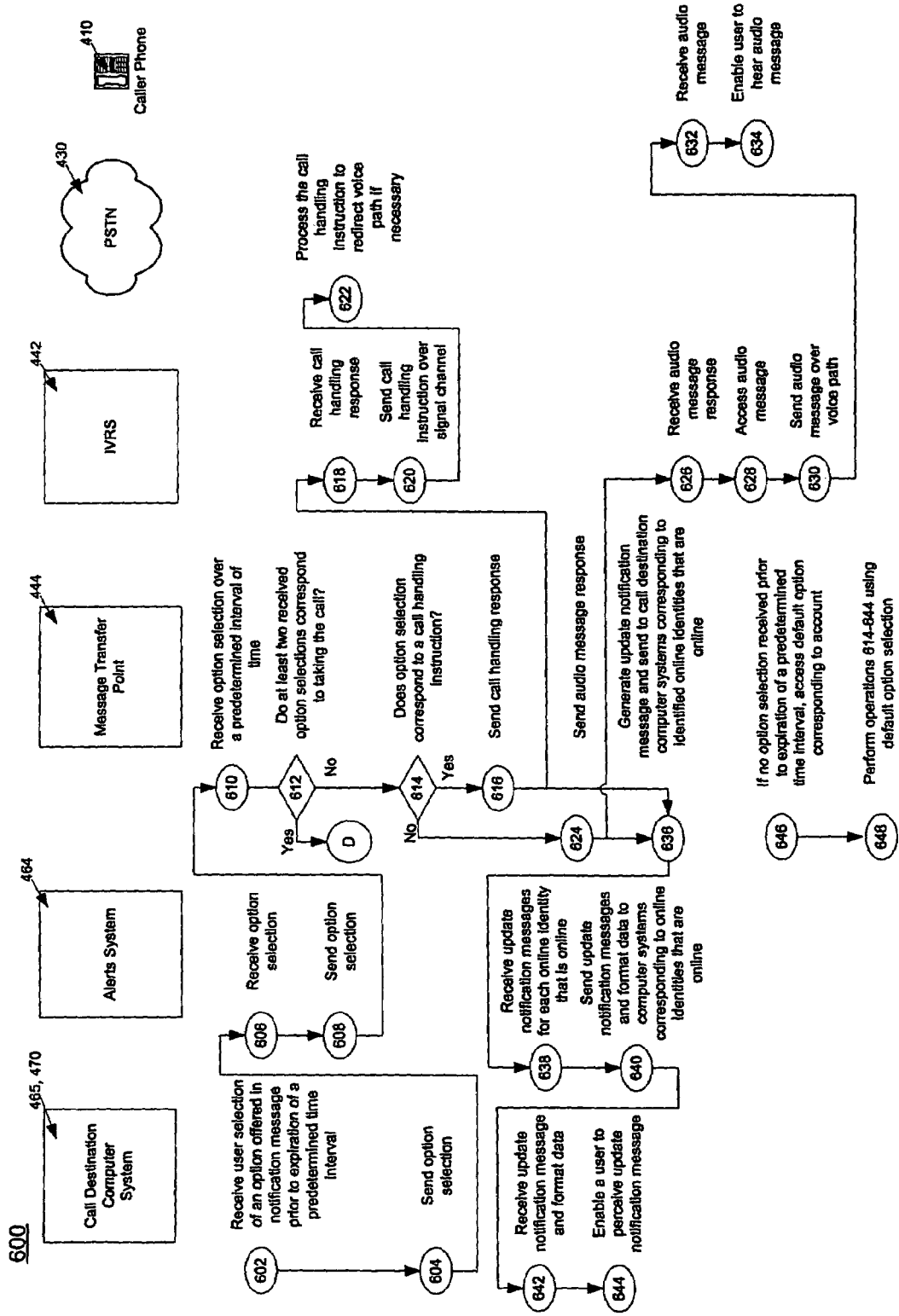
FIGS. 6A, 6B, 6C, and 6D are flow chart illustrating a process for responding to a user selection of an option in a call notification message.
Figure 6B:
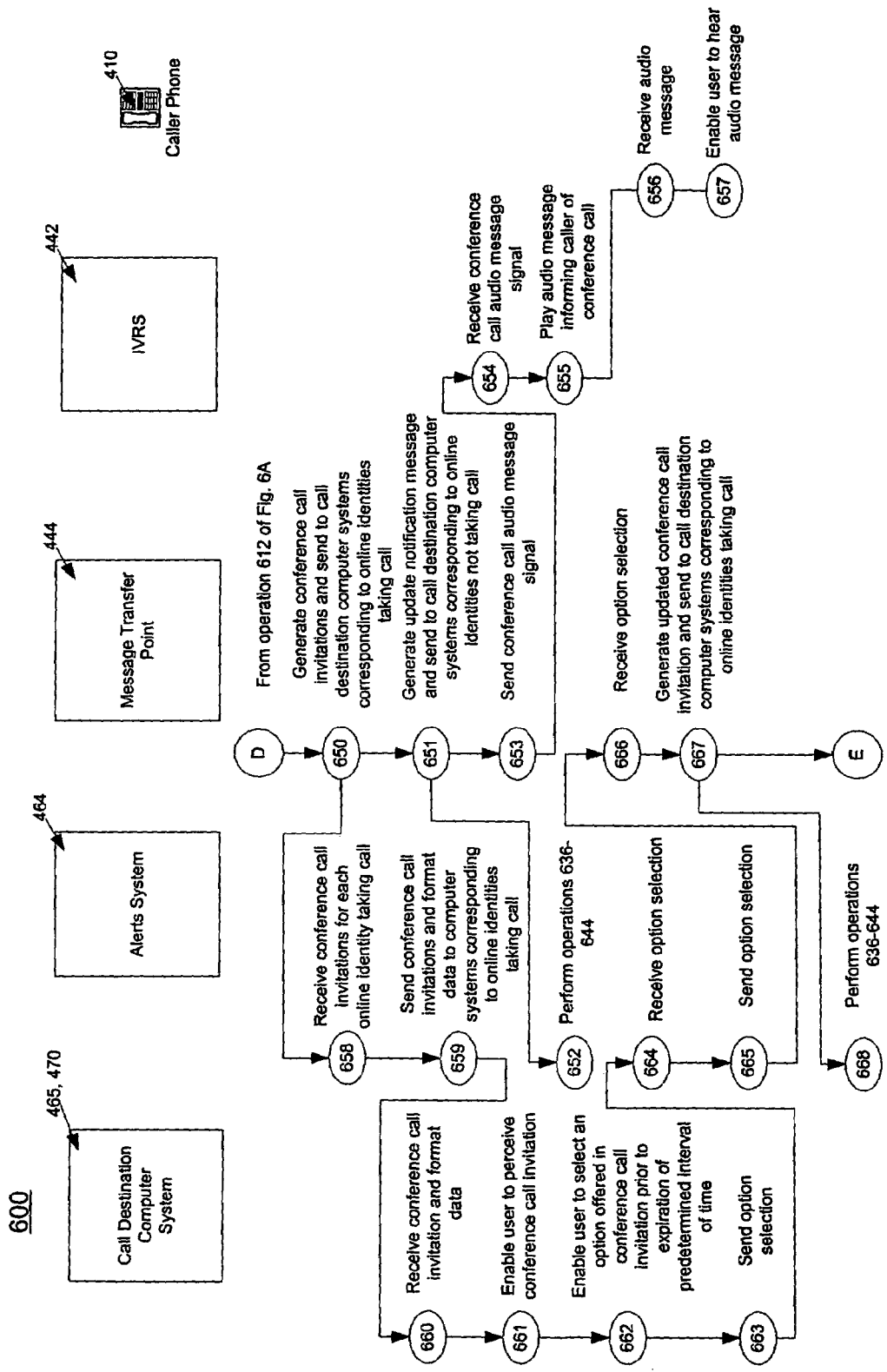
Figure 6C:
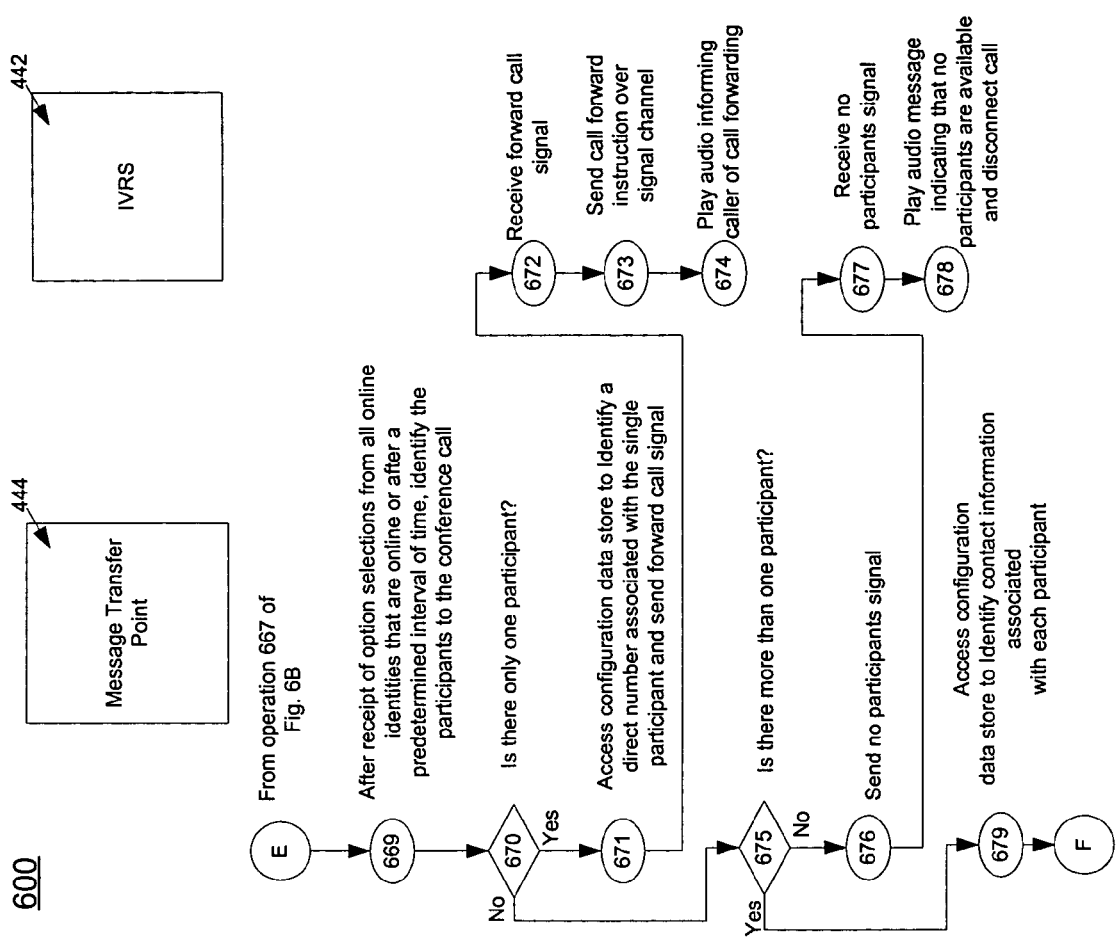
Figure 6D:
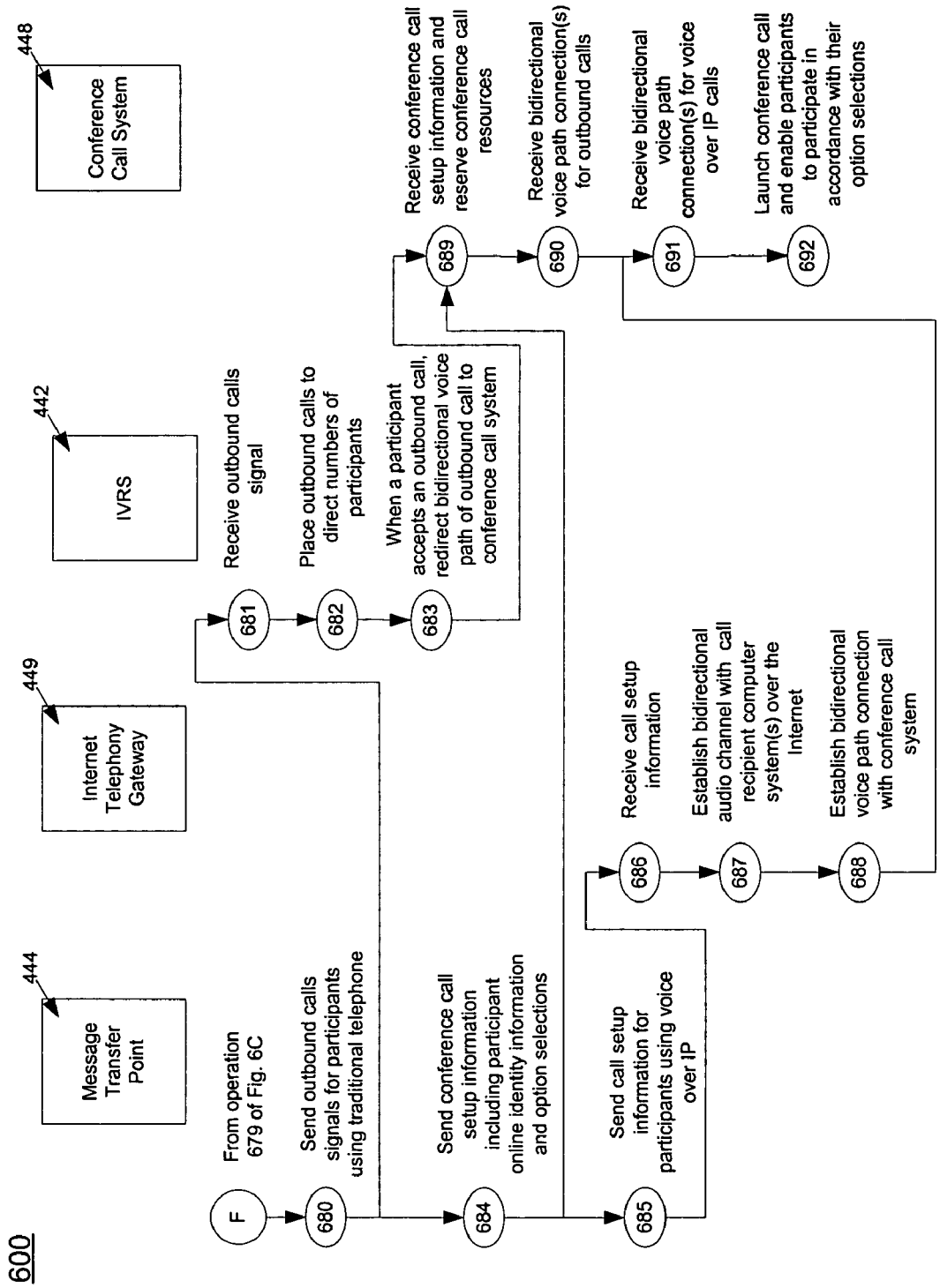

FIGS. 5A and 5B show a process 500 for generating and delivering call notification messages. For ease of discussion, particular components described with respect to FIG. 4 are referenced as performing the process 500. However, similar methodologies may be applied in other implementations where different components are used to define the structure of the system, or where the functionality is distributed differently among the components shown by FIG. 4. Process 500 is similar to an implementation of process 200 but applied to the communications system 400 rather than to the communications system 100.

The user of the caller phone 410 dials the direct number of the first call destination phone 415 (502). The PSTN 430 determines whether the direct number of the first call destination phone 415 is busy (504). If the direct number of the first call destination phone 415 is not busy, no call waiting is necessary, and the PSTN 430 completes the call setup between the caller phone 410 and the first call destination phone 415 (506).

If the direct number of the first call destination phone 415 is busy, the PSTN 430 sends the call destination phone direct number and other call-related information over a signaling channel to the IVRS 442 (508). The IVRS 442 receives the direct number of the first call destination phone 415 and the other call-related information (510) and sends a validation request to the message transfer point 444 to determine whether the direct number of the first call destination phone 415 is registered for call waiting service (512).

The message transfer point 444 receives the validation request (514) and accesses the configuration data store 446 (516) to determine whether the direct number of the first call destination phone 415 is registered for call waiting service (518). If the direct number of the first call destination phone 415 is not registered for call waiting service, the message transfer point 444 sends a destination number not validated response to the IVRS 442 (520). The IVRS 442 receives the destination phone number not validated response (522) and sends a no accept signal over the signaling channel to the PSTN 430 (524). In response to the no accept signal, the PSTN 430 sends a busy signal to the caller phone 410 and does not setup a voice path between the caller phone 410 and the IVRS 442 (526. ). In another implementation, the IVRS 442 instructs the PSTN 430 to redirect the voice path to a direct number corresponding to a voice messaging or voice mail system rather than instructing the PSTN 430 to send a busy signal.

If the direct number of the first call destination phone 415 is registered for call waiting service, the message transfer point 444 accesses the configuration data store 446 to identify an account based on the direct number of the first call destination phone 415 (528) and to retrieve account-level preferences (530). The account may be identified, for example, by accessing an account record stored in the configuration data store 446 and indexed by direct number of the first call destination phone 415. The account-level preferences also may be included in the account record. The message transfer point 444 determines whether account-level preferences are applicable to the direct number of the caller phone 410 (532). If account-level preferences are applicable, then the message transfer point 444 performs operations 614-634 (FIG. 6) using the account-level preference option stored in the account record (534).

If account-level preferences are not applicable to the direct number of the caller phone 410 (e.g., the direct number of the caller phone 410 is not on a white list or a black list), or if appropriate, after applying account-level preferences, the message transfer point 444 accesses the account record stored in the configuration data store 446 to identify online identities associated with the account (536). The message transfer point 444 accesses corresponding online identity records to retrieve online identity-level preferences (538).

The message transfer point 444 identifies which online identities may be able to receive a call notification message based on the online identity-level preferences (e.g., the direct number of the caller phone 410 may be on the prohibited list of some of the online identities or parental controls may prohibit some of the online identities from receiving a call notification message) (538). The message transfer point 444 sends a request to the presence server 462 for the online status of the identified online identities (540).

The presence server 462 receives the request for the online status of the identified online identities (542) and accesses the online status of the identified online identities from a data store (544). The presence server 462 sends the online status of the identified online identities to the message transfer point 444 (546).

The message transfer point 444 receives the online status of the identified online identities (548) and determines whether at least one identified online identity is online (550). If no identified online identities are online, process 500 proceeds to operation 520. If at least one identified online identity is online, the message transfer point 444 sends a destination phone number validated response to the IVRS 442 (552). The IVRS 442 receives the destination phone number validated response (554) and sends an accept signal over the signaling channel to the PSTN 430 (556). In response to the accept signal, the PSTN 430 sends a ringing signal to the caller phone 410 and sets up a voice path between the caller phone 410 and the IVRS 442 (558).

The message transfer point 444 accesses the configuration data store 446 to retrieve call notification format information corresponding to the identified online identities that are online (560). The call notification format information may be stored in the online identity records as an online identity-level call waiting preference. The message transfer point 444 generates a call notification message for each online identity that is online in accordance with the retrieved call notification message formats (562) and sends the call notification messages to the alerts system 464 (564).

The alerts system 464 receives the call notification messages (566) and sends the call notification messages along with format data to call destination computer systems 465, 470 corresponding to the online identities (568). The receiving of the call notification messages and sending of the call notification messages and format data are performed in real time.

Each call destination computer system 465, 470 receives the call notification message and format data (570) and enables a user to perceive the call notification message (572). In one implementation, the call destination computer system 465, 470 enables the user to perceive the call notification message as a pop-up window or dialog box that appears on a visual display of the call destination computer system 465, 470.

FIG. 6 shows a process 600 for responding to a user selection of an option in a call notification message. For ease of discussion, particular components described with respect to FIG. 4 are referenced as performing the process 600. However, similar methodologies may be applied in other implementations where different components are used to define the structure of the system, or where the functionality is distributed differently among the components shown by FIG. 4. Process 600 is similar to an implementation of process 300 but applied to the communications system 400 rather than to the communications system 100.

The call destination computer system 465, 470 enables a user to select an option offered in the call notification message prior to expiration of a predetermined time interval (e.g., 15 seconds) (602). The call destination computer system 465, 470 sends the option selection to the alerts system 464 (604).

The alerts system 464 receives the option selection (606) and sends the option selection to the message transfer point 444 (608). The alerts system 464 is configured to receive and send the option selection to the message transfer point 444 in real time.

The message transfer point 444 receives the option selection (610). The message transfer point 444 waits for a predetermined interval of time (e.g., 15 seconds) to receive option selections from multiple call destination computers 465, 470, and selects one of the received options selections in accordance with the rank-based conflict resolution algorithm. The ranks may be assigned by user online identity or by level of responsiveness to the call. Process 600, however, assumes that if two option selections are received that correspond to taking the call, a conference call may be launched irrespective of the ranks assigned to user online identities or to option selections.

After a predetermined interval of time or after having received option selections from all user online identities, the message transfer point 444 determines whether at least two of the received option selections correspond to taking the call (612). If two or more received option selections correspond to taking the call, the process 600 proceeds to operation 650. If one or none of the received option selections correspond to taking the call, the message transfer point 140 selects one of the received option selections in accordance with the rank-based conflict resolution algorithm.

The message transfer point 444 determines whether the option selection includes a call handling instruction (i.e., an instruction to forward or ignore the call) (614). If the option selection includes a call handling instruction, the message transfer point 444 sends a call handling response corresponding to the call handling instruction to the IVRS 442 (616). The call handling response may be, for example, an identification number used by the IVRS 442 to determine the call handling instruction that will be sent to the PSTN 430.

The IVRS 442 receives the call handling response (618) and sends a corresponding call handling instruction to the PSTN 430 over the signaling channel (620). The PSTN 430 processes the call handling instruction and, if necessary, forwards or redirects the voice path accordingly (622).

If the option selection does not correspond to a call handling instruction, then the message transfer point 444 sends an audio message response corresponding to the audio message to the IVRS 442 (624). The audio message response may be, for example, an identification number used by the IVRS 442 to identify the storage location of the audio message that will be sent to the caller phone 410.

The IVRS 442 receives the audio message response (626), accesses an audio message corresponding to the audio message response (628) and sends the audio message over the voice path to the caller phone 410 (630). The caller phone 410 receives the audio message (632) and enables a user to hear the audio message (634).

After sending a call handling response and/or an audio message response to the IVRS 442, the message transfer point 444 generates an updated call notification message for each identified online identity that is online and sends the updated call notification messages to the alerts system 464 (636). The alerts system 464 receives the updated call notification messages (638) and sends the updated call notification messages to the corresponding call destination computer systems 465, 470 (640). Each call destination computer system 465, 470 receives an updated call notification message (642) and enables a user to perceive the updated call notification message (644).

If the message transfer point 444 does not receive an option selection after a predetermined interval of time from any of the call destination computer systems 465, 470 that received call notification messages, the message transfer point 444 automatically accesses a default option selection corresponding to the account (and stored as an account-level preference) (646). The message transfer point 444 processes the default option selection in accordance with operations 614-644 (648).

If two or more received option selections correspond to taking the call, the message transfer point 444 generates and sends conference call invitations addressed to the user online identities that selected to take the call (i.e., potential conference call participants) (650). The conference call invitations typically are sent out in parallel to minimize transmission delays and the arrival time difference between call destination computer systems 465, 470. The message transfer point 444 may generate the conference call invitations in accordance with format preferences stored for each user online identity.

The message transfer point 444 generates conference call invitations for each user online identity that selected to take the call and sends the conference call invitations to the alerts system 464 (650). The conference call invitations are generated using format preferences stored for each user online identity in the configuration data store 446.

The message transfer point 444 also generates and sends updated call notification messages to the online identities that selected not to take the call (651). The alerts system 464 and the call destination computer systems 465, 470 process the updated call notification message in accordance with operations 636-644 (652).

The message transfer point 444 sends a conference call audio message signal to the IVRS 442 (653). The IVRS 442 receives the conference call audio message signal (654) and plays an audio message informing the call that a conference call may be initiated (655). The caller phone 410 receives the audio message (656) and enables a user to hear the audio message (657). The audio message may optionally include a spoken version of the online identities that may participate in the conference call.

The alerts system 464 receives the conference call invitations (658) and sends the conference call invitations along with format data to call destination computer systems 465, 470 corresponding to the potential participants (659). The receiving of the conference call invitations and sending of the conference call invitations and format data may be performed in real time.

Each call destination computer system 465, 470 receives the conference call invitation and format data (660) and enables a potential participant to perceive the conference call invitation (661). In one implementation, the call destination computer system 465, 470 enables the potential participant to perceive the conference call invitation as a pop-up window or dialog box that appears on a visual display of the call destination computer system 465, 470.

The call destination computer system 465, 470 enables the potential participant to select an option offered in the conference call invitation prior to expiration of a predetermined time interval (e.g., 2 minutes) (662). The call destination computer system 465, 470 sends the conference call option selection to the alerts system 464 (663).

The alerts system 464 receives the conference call option selection (664) and sends the option selection to the message transfer point 444 (665). The alerts system 464 may be configured to receive and send the option selection to the message transfer point 444 in real time.

The message transfer point 444 receives the conference call option selection (666) and generates an updated conference call invitation for each potential participant and sends the updated conference call invitations to the alerts system 464 (667). The alerts system 464 and the call destination computer systems 465, 470 process the updated conference call invitations in accordance with operations 636-644 (668).

After the message transfer point 344 receives option selections from all call destination computer systems 465, 470 or after a predetermined interval of time (e.g., 2 minutes), the message transfer point 344 identifies the participants to the conference call based on the received option selections (669). The message transfer point 344 determines whether only one participant wishes to join the call (670). If the conference call connection options associated with that potential participant indicate that the potential participant wishes to use the call destination telephone 415, 420 to connect to the conference call over the PSTN 430, the message transfer point 444 sends a forward call signal to the IVRS 446 (671). The IVRS 446 receives the forward call signal (672), sends a call forward instruction to the PSTN 430 over a signal channel (673), and plays an audio message informing the caller that only one participant wishes to join and the call is being forwarded to that participant (674). The PSTN 430 forwards the call to the appropriate call destination telephone 415, 420 in accordance with the forward call signal received from the IVRS 446.

If the conference call connection options associated with the one potential participant that wishes to participate in the call indicate that the potential participant wishes to use the call destination computer system 465, 470 to connect to the conference call over the Internet 450, the message transfer point 444 sends appropriate call setup information to the Internet telephony gateway 449. The Internet telephony gateway 449 then enables the destination computer system 465, 470 of the potential participant to communicate with the conference call system 448 over a bi-directional audio channel (not shown).

The message transfer point 444 determines whether more than one potential participant wishes to participate in the conference call (675). If no potential call recipients wish to join the conference call, the message transfer point 444 sends a no participants signal to the IVRS 442 (676). The IVRS 442 receives the no participants signal (677) and plays an audio indicating to the caller that no participants are available to join the conference call (678). The IVRS 442 then instructs the PSTN 430 to disconnect the call (678).

If more than one potential call participant wishes to join the conference call, the message transfer point 444 accesses the configuration data store 446 to identify contact information associated with each potential participant (679). If one or more potential participants have chosen to connect to the conference call over the PSTN 430, the message transfer point 444 sends an outbound calls signal to the IVRS 442 (680). The outbound calls signal includes the telephone numbers of those participants that have chosen to connect to the conference call over the PSTN 430. The IVRS 442 receives the outbound calls signal (681) and places outbound calls to the telephone numbers of the corresponding potential participants over the PSTN 430 (682). When a potential participant accepts an outbound call, the WVRS 442 redirects the bi-directional voice path of the outbound call to the conference call system 448 (683).

The message transfer point 444 also sends conference call setup information to the conference call system 448 (684). If one or more potential participants have chosen to connect to the conference call over the Internet 450 using, for example, voice-over-IP, the message transfer point 444 sends call setup information to the Internet telephony gateway 449 for each of the potential participants that selected to connect to the conference call over the Internet 450 (685). The call setup information varies depending on the communications protocol used by the Internet telephony gateway 449 but typically includes the IP addresses of the destination computer systems 465, 470 associated with the respective participants. The call setup information also typically includes the telephone numbers and/or trunk group identifiers assigned to the respective participants. The Internet telephony gateway 449 receives the call setup information (686) and establishes a bi-directional audio channel with the destination computer systems 465, 470 (687). The Internet telephony gateway 449 also establishes a bi-directional voice path with the conference call system 448 for the corresponding destination computer system 465, 470 (688). The gateway 449 enables audio communication between a recipient computer system 465, 470 and the conference call system 448 by receiving voice data packets from the destination computer system 465, 470 over the bi-directional audio channel, decoding the voice data packets, converting the voice data packets to audio, and sending the audio to the conference call system 448 over the voice path assigned to that call destination computer system 465, 470.

The conference call system 448 receives conference call setup information from the message transfer point 444 and reserves conference call resources (689). For example, the conference call system 448 may reserve a physical or virtual communications port for participants in accordance with the conference call setup information. The conference call system also receives bidirectional voice path connections for the outbound calls placed by the IVRS 442 (690) and for the Internet telephony calls placed by the Internet telephony gateway 449 (691). Once all participants have been connected to the conference call system 448 over a voice path, the conference call system 448 launches a conference call that enables participants to participate in accordance with their option selections (692).

In another implementation, the message transfer point 444 does not wait to receive option selections from all potential participants before setting up the conference call. Rather, the message transfer point 444, the Internet telephony gateway 449, and the IVRS 442 perform operations 679-692 as soon as two participants agree to join the call. Additional participants may then join the conference call in progress by selecting the option to join the conference call in the updated conference call invitation. The updated conference call invitation may indicate to the remaining potential participants that the conference call is in progress. In this implementation, the additional participants may be allowed to join the conference call at any time during its duration (i.e., they are not forced to select a participation option in the predetermined time interval). Alternatively, the additional participants may be allowed to join the conference call only for a predetermined interval of time while the conference call is in progress (e.g., one minute).

Figure 7:
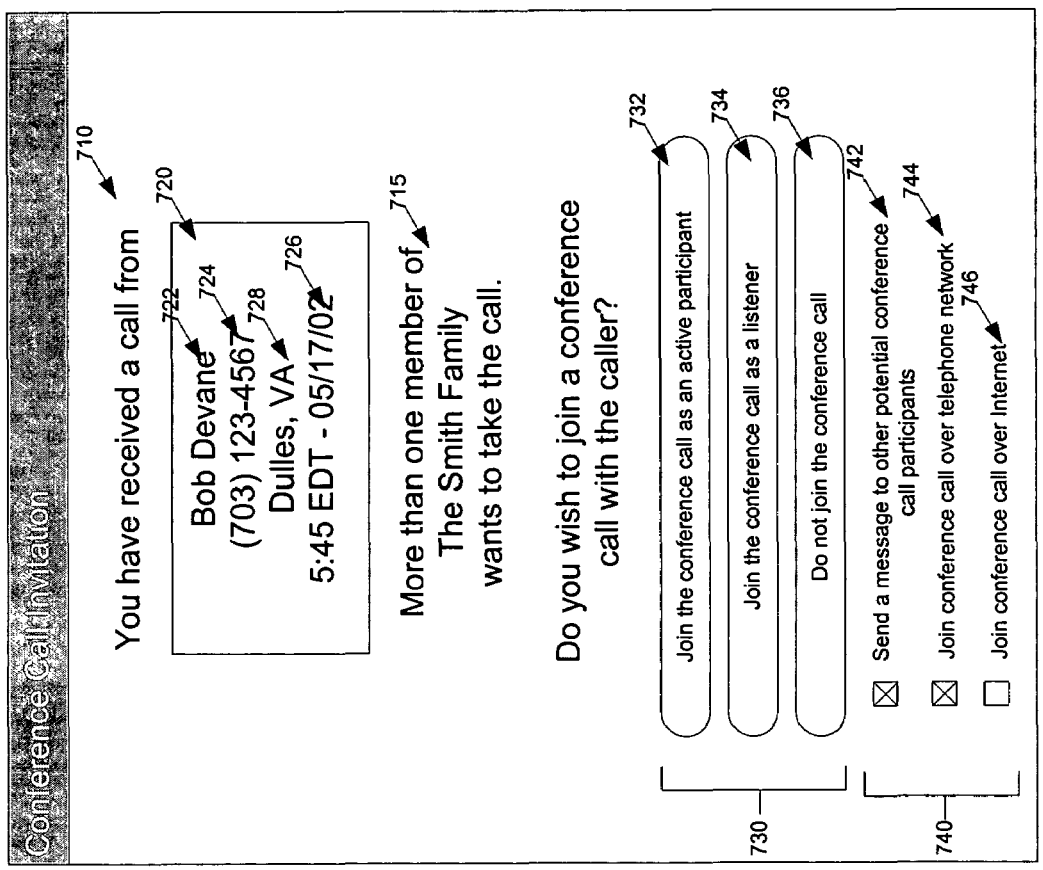
FIG. 7 is a user interface presented to a user upon receipt of a conference call invitation.

FIG. 7 shows a user interface 700 that may be presented to the user by the call destination computer system 165, 170, 465, 470 upon receipt of a conference call invitation. The user interface 700 includes a statements 710 and 715 informing the user of the conference call invitation and the name of the account associated with the direct number to which the call was directed (e.g., "The Smith Family"). In another implementation, the statement 715 also may inform the user of the online identities corresponding to users that have selected to take the call (e.g., "Rick and Tom of the Smith Family want to take the call.").

The user interface 700 also includes caller-related information 720. The caller-related information 720 may include the name of the caller 722 (e.g., Bob Devane), the direct number of the caller telephone 724 (e.g., (703) 123-4567), the time and date when the call was received 726 (e.g., 5:45 EDT on May 17, 2002), and other caller-related information 728 that may be determined based on the direct number of the caller telephone 110, 410. The other caller-related information 728 may include, for example, the geographic location of the caller (e.g., Dulles, Va.) and information stored in an address book or calendar that is accessible based on the direct number of the caller telephone 110, 410 (e.g., Meeting scheduled with Bob on Saturday Jul. 12, 2003). Such information may be stored locally at the call destination computer system 165, 170, 465, 470 or may be accessible from a remote device across the data network 150 or the Internet 450.

The user interface 700 also includes participation option buttons 730 and checkboxes 740 that may be selected by the user to react to the call. The participation option buttons 730 may include, for example, an option button to join the conference call as an active participant 732, an option button to join the conference call as a listener 734, and an option button to not join the conference call 736. The checkboxes 740 may include, for example, a checkbox 742 to send a message to the other potential participants of the conference call, a checkbox 744 to join the conference call over the telephone network 130 or the PSTN 430, and a checkbox 746 to join the conference call over the data network 150 or the Internet 450.

Selecting the option button to join the call as an active participant 732 results in the user joining the call and being able to both listen and speak to the other participants. Selecting the option button to join the conference call as a listener 734 results in the user joining the call and being able to listen but not speak to the other participants. Selecting the option button to not join the conference call 736 results in the user rejecting the invitation to join the conference call (surprise!).

The user may choose to send a message to the other potential conference call participants by selecting (i.e. "checking") checkbox 742. If the user selects checkbox 742, upon the user selecting one of the participation option buttons 730, the user is prompted to input (or speak) a message or to select a predetermined message from a list of messages. The message is sent as part of the option selection to the ICWCCPS 140, 440. In another implementation, the user interface 700 does not include checkbox 742 and the user is only prompted to input a message if the user selects to not participate in the conference call.

The user may choose to connect to the conference call over the telephone network 130 or over the PSTN 430 by selecting checkbox 744. The user may choose to connect to the conference call over the data network 150 or over the Internet 450 by selecting checkbox 746.

The user interface 700 may vary depending on the capabilities of the call destination computer systems 165, 170, 465, 470 and the format data received from the online service provider system 160, 460. As mentioned before, call destination computer systems 165, 170, 465, 470 with more limited capabilities may provide less caller-related information 710 and less call participation options 730 and checkboxes 740 while call destination computer systems 165, 170, 465, 470 with greater capabilities may provide more caller-related information 710 and more options 730 and checkboxes 740.

Figure 8:
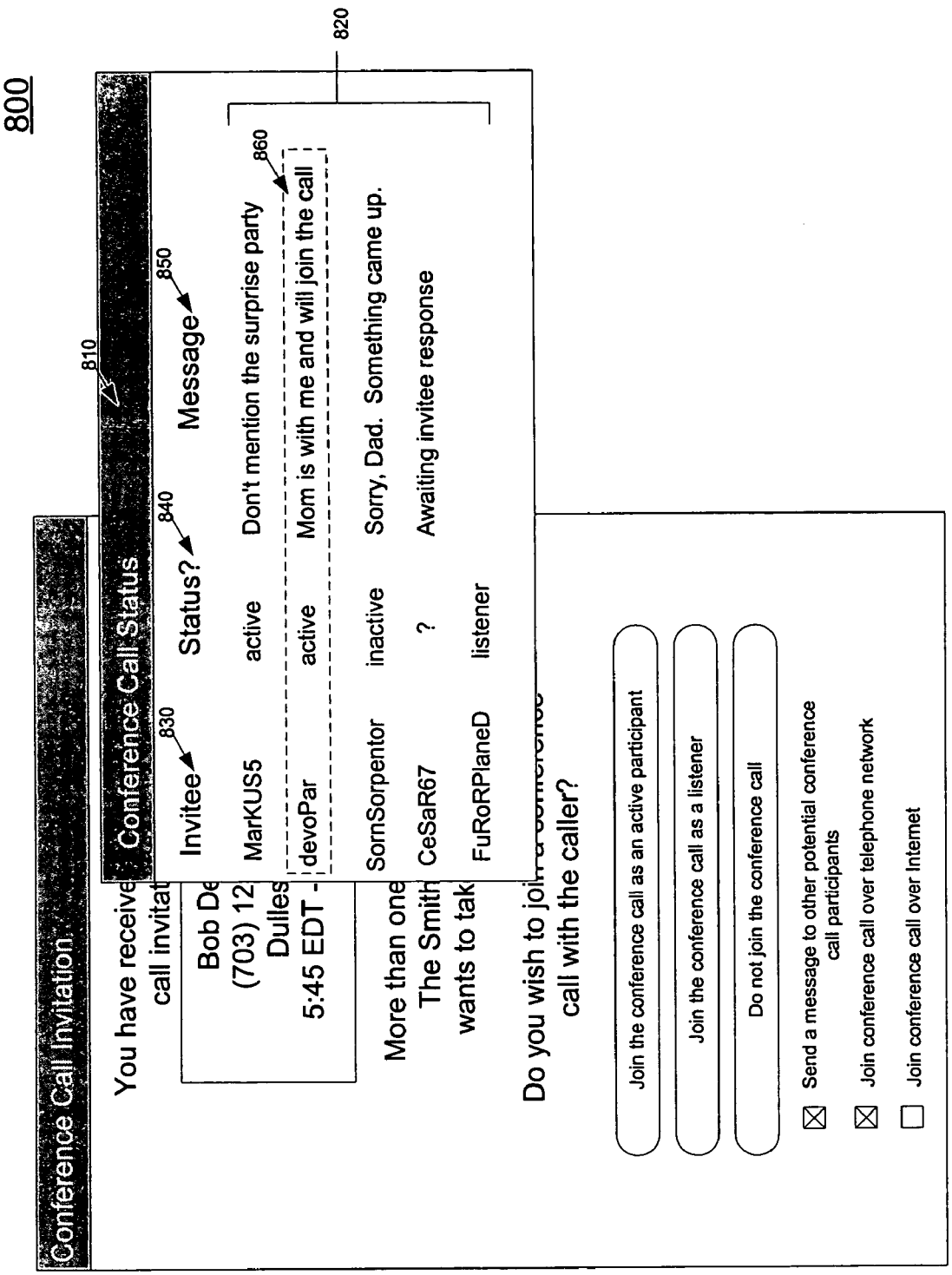
FIG. 8 is a user interface presented to a user upon receipt of an updated conference call invitation.

FIG. 8 shows a user interface 800 that may be presented to the user by the call recipient computer system 165, 170, 465, 470 upon receipt of an updated conference call invitation. The user interface 800 includes a conference call status window 810. The conference call status window 810 includes a list 820 of data entries. Each data entry corresponds to a potential conference call participant. The list 820 is divided into an invitee column 830, a status column 840, and a message column 850. A representative data entry 860 is shown.

The invitee column 830 displays the user online identities of the potential participants. The status column 840 includes the participation status of the potential participants. The participation status may be designated, for example, as "active" to indicate an active participant, "inactive" to indicate a potential participant who will not be joining the conference call, "listener" to indicate a participant that will listen to the conference call but not otherwise participate in the conference call, and "?" to indicate a potential participant that has yet to select a participation option in response to a conference call invitation. The message column 850 includes messages sent by the potential participants to be viewed by all potential participants. The messages typically relate to the conference call or the message sender's participation in the conference call. The representative data entry 860 shows that the user online identity "devoPar" has chosen to actively participate in the conference call and has sent to the other potential participants the message "Mom is with me and will join the call."

In another implementation, the information disclosed in the conference call status window 810 may be incorporated into the user interface 700 in a separate portion of the user interface 700 designated as, for example, "Conference Call Status." In yet another implementation, the conference call status window 810 only shows a total number of invitees for each status category (e.g., 3 active, 2 listener, 1 inactive, and 5 ?) and only shows a data entry 860 for those potential participants that send a message to the other potential participants.

A number of implementations have been described. Nevertheless, it will be understood that various modifications may be made. For example, the systems and processes refer to a voice path and a signaling channel. In some implementations, the voice path and the signaling channel are separated (i.e., out-of-band signaling). In other implementations, the voice path and the signaling channel are integrated into one channel (i.e., in-band signaling) that handles the transmission of audio data as well as the transmission of call handling data.

The telephone network 130 may be configured to always send a signal to the ICWCCPS 140, regardless of whether the first call destination phone 115 is busy or is not answered. In response to the signal, the ICWCCPS 140 sends a call notification message to user online identities associated with the first call destination phone 115 that are online. In this manner, the user online identities may monitor the use of the of the call destination phone 120. Such monitoring may be used, for example, to enable parental control of the first call destination phone 115 (e.g., a father may want to known who has been calling his daughter).

The conference call participation options may include an option to record the conference call. Selecting the option to record the conference call results in the message transfer point 444 instructing the IVRS 442 to establish a unidirectional voice path with the conference call system 448. The IVRS 442 receives the audio of the conference call through the unidirectional voice path and records the conference call as an audio file. The IVRS 442 sends the audio file to the message transfer point 444. The message transfer point 444 accesses the e-mail address of the potential call recipient that selected to record the conference call. The e-mail address of the potential call recipient may be stored as additional contact information in the configuration data store 446. The message transfer point 344 may access the configuration data store 446, retrieve the corresponding e-mail address, and then send the audio file containing the conference call recording as an attachment to an e-mail sent to that e-mail address. The message transfer point 344 also may send an updated conference call invitation to all of the participants to inform them that the conference call is or will be recorded.

In another implementation, when a potential participant selects the option to take the conference call, the potential participant may be prompted to input a telephone number to which the outbound call will be placed by the ICWCCPS 140, 440. The potential participant may then join the conference call by answering the outbound call placed to that specified telephone number.

In yet another implementation, the potential participants may select and submit audio messages that are queued up by the IVRS 442 and played to the participants at the start of the conference call. The audio message may be predetermined and stored in an audio file at the call destination computer system 465, 470. Additionally or alternatively, the audio message may be spoken by the potential participant and recorded in an audio file by the call destination computer system 465, 470. The audio file may then be sent to the message transfer point 444 as part of the option selection of the potential call recipient. Additionally or alternatively, the option selection may include a pointer to the audio file which is stored in a data store communicatively coupled to the message transfer point 444. The message transfer point 444 receives or otherwise accesses the audio file and sends it or makes it available to the IVRS 444. The IVRS 444 queues up any audio files received from message transfer point 444 and establishes a unidirectional voice path with the conference call system 448. Once the conference call is initiated, the IVRS 444 may inform the participants of the number of audio messages sent by the potential call recipients and may then convert each audio file to audio and play sequentially or otherwise the audio to the participants of the conference call.

In another implementation, the caller telephone 110, 3410 maybe a data telephone and may call the ICWCCPS 140, 440 over the data network 150 or over the Internet 450. The telephony gateway in the ICWCCPS 140 may encode and decode voice data packets as necessary to enable the ICWCCPS 140, 440 to provide the same functionality as described above.

In another implementation, the call participation and call connection options for each user may be preselected by the user during service registration. When two users select to take an incoming call, a conference call may be automatically initiated without the use of a conference call invitation.

In another implementation, the conference call options that appear in the conference call invitation may include an option to display or close the conference call status window. The conference call status window indicates the participation status of the identities that chose to take the call in response to the call notification message and/or the participation status of any identity that received a conference call invitation. Similarly, the call notification message graphical user interface may include an option selectable by a recipient to display or close a section or a window of the graphical user interface that displays the online identity and the corresponding current options selected by the other call recipients that received call notification messages.

In another implementation, the conference call service may be a fee-based service to which only some of the online identities have subscribed. The conference call invitations may be sent to only those online identities that have registered for the service, and the participants to the conference call with the caller may be restricted to participants corresponding to online identities that are registered.

One or more aspects of the ICWCCPS 140, 440 may be replaced by one or more aspects of an intelligent call screening system, such as that described in U.S. patent application Ser. No. 10/674,821, filed Oct. 1, 2003, and titled INTELLIGENT CALL SCREENING OF TRADITIONAL TELEPHONY CALLS, hereby incorporated by reference in its entirety. In this implementation, the intelligent call screening system queries an online service provider system in the manner described above to determine the online status of a call recipient. If the call recipient is online, the intelligent call screening system sends a call notification message through the online service provider system in the same manner as discussed above for the ICWCCPS 140, 440 (i.e., by applying call notification message distribution preferences). The call notification message presents various call handling options including an option to take a message. If the call recipient selects the option to take a message, the intelligent call screening system sends a call screening message to the call destination computer system through the online service provider systems. The call screening message is sent to the call destination computer system 165, 170, 465, 470 in the same manner as that used to send the call notification message. The call screening message presents call handling options similar to those presented by the call notification message. The call screening message, however, enables the call recipient to select an option while simultaneously hearing the caller deposit a voicemail.

In another implementation, the ICWCCPS 140 may be configured to enable the caller to control the setup of the conference call. The ICWCCPS 140 may present the caller with names or online identities of call recipients that are online and associated with the not answered, busy, or otherwise unavailable telephone number. The caller may then be presented with options enabling the caller to select to send a conference call invitation and/or a call notification message to one or more of the online call recipients. The caller may manually select the subset using a telephone keypad or by responding to an IVR.

Additionally or alternatively, the subset may be determined based on information known about the caller or based on preferences setup for the caller and accessible to the ICWC-CPS 140. For example, if two of seven identities associated with a called number are in the caller's contact list or buddy list, the caller may be asked to press "1" to inspire delivery of a conference call invitation to only the two buddies, press "2" to inspire delivery of a conference call invitation to all seven identities, and press "3" to simply leave a voicemail.

In another example, a teenage caller is calling his girlfriend's house. The teenage caller may only want a call notification message to be sent to his girlfriend's online identity and not to the online identity of any of the other members of her family that also are online and associated with the direct number of her house. If the online identity of his girlfriend is in his contact list, the ICWCCPS 140 may ask the teenage caller to press "1" to inspire delivery of a call notification message to only his girlfriend and press "2" to inspire delivery of a call notification message to his girlfriend and to the other members of her family that are online. If his girlfriend is not online, the ICWCCPS 140 may inform the teenage caller that she is not online and the teenage caller may choose whether or not to proceed with the call.

Moreover, the ICWCCPS 140 may inform the caller of the online identities that were sent call notification messages and/or conference call invitations and also may inform the caller of their corresponding call notification option selections and conference call option selections. The caller may then choose whether or not to proceed with the call or conference call or whether or not to request that call notification messages or conference call invitations be sent to additional online identities associated with the called number (or not associated with the called number). For example, in keeping with the above example, if a teenager is calling his girlfriend's house and the teenager's girlfriend is not online but her two sisters are not online, the teenage caller may choose to send call notification messages to the two sisters. If one of the two sisters selects the option to take the call in response to the call notification message, the teenage caller may decide that there is no need for a conference call involving her other sister. Rather than allowing the other sister to inspire a conference call by selecting the option to take the call in response to the call notification message, the teenage caller may select to close the call notification window on the other sister's computer/client device prior to her selecting an option.

Accordingly, other implementations are within the scope of the following claims.

What is claimed is:

1. A method for initiating a conference call using a call waiting graphical user interface, the method comprising:
   receiving an indication that an incoming telephone call is directed to a telephone number;
   identifying an account associated with the telephone number to which the incoming telephone call is directed;
   accessing configuration data related to the account;
   identifying a first online identity and a second online identity associated with the account based on the configuration data accessed;
   sending a first electronic communication to the first online identity;
   sending a second electronic communication to the second online identity;
   enabling the first online identity to respond to the first electronic communication;
   enabling the second online identity to respond to the second electronic communication; and
   initiating a conference call between the caller and the first and second online identities conditioned on whether the responses by the first and second online identities indicate that both the first and second online identities wish to take the call.

2. The method of claim 1, further comprising determining the availability of the first online identity to receive the first electronic communication associated with the telephone call.

3. The method of claim 2, wherein sending the first electronic communication is conditioned on whether the first online identity is determined to be available to receive the first electronic communication.

4. The method of claim 2, wherein determining the availability of the first online identity includes checking the online status for the first online identity, and wherein the first electronic communication is sent to the first online identity if the first online identity is determined to be online.

5. The method of claim 1, wherein enabling the first online identity to respond to the first electronic communication comprises enabling the first online identity to respond to the first electronic communication while the caller is waiting for call disposition.

6. The method of claim 1, wherein identifying an account based on a telephone call comprises identifying an account based on call-related information received from a telephone network.

7. The method of claim 6, wherein the call-related information includes a call destination telephone number and is extracted from an integrated services digital network call setup.

8. The method of claim 1, further comprising receiving from a telephone network call origin information that includes a caller telephone number and is received through an automatic number identification service.

9. The method of claim 8, wherein the first and second electronic communications include at least a portion of the call origin information.

10. The method of claim 1, wherein the first and second online identities comprise user identifiers through which an online status of an associated user may be determined.

11. The method of claim 1, wherein enabling the first online identity to respond to the first electronic communication includes enabling the first online identity to select from among one or more call processing options.

12. The method of claim 11, wherein the call processing options are personalized to the first online identity.

13. The method of claim 11, wherein the call processing options include an option to take a message from the caller.

14. The method of claim 11, wherein the call processing options include an option to ignore the call.

15. The method of claim 11, wherein the call processing options include an option to send an audio message to the caller.

16. The method of claim 11, wherein the call processing options include an option to display a list of other online identities associated with the called telephone number or account who have selected to take the call.

17. The method of claim 11, wherein the call processing options include an option to take the call.

18. The method of claim 17, wherein:
   enabling the second online identity to respond to the second electronic communication includes enabling the second online identity to select from among one or more call processing options; and
   initiating a conference call includes initiating a conference call conditioned on whether the first and second online identities both select an option to take the call.

19. The method of claim 18, wherein initiating a conference call includes:
sending to the first online identity a first electronic conference call invitation that is distinct of the first electronic communication;
enabling the first online identity to respond to the first electronic conference call invitation;
sending to the second online identity a second electronic conference call invitation that is distinct of the second electronic communication;
enabling the second online identity to respond to the second electronic conference call invitation; and
initiating a conference call between the caller and the first and second online identities conditioned on whether the responses to the first and second electronic conference call invitations indicate that both the first and second online identities wish to participate in the conference call.

20. The method of claim 19, wherein enabling the first online identity to respond to the first electronic conference call invitation comprises enabling the first online identity to select from among one or more options.

21. The method of claim 20, wherein the options are personalized to the first online identity.

22. The method of claim 20, wherein the options include call participation options.

23. The method of claim 22, wherein the call participation options include an option selectable to actively participate in a conference call with the caller.

24. The method of claim 22, wherein the call participation options include an option selectable to allow the user to listen but not speak when participating in the conference call with the caller.

25. The method of claim 22, wherein the call participation options include an option selectable to not participate in a conference call with the caller.

26. The method of claim 22, wherein the call participation options include an option to send a message to the second online identity.

27. The method of claim 26, wherein the message is a text message.

28. The method of claim 26, wherein the message is an audio message.

29. The method of claim 22, wherein the call participation options include an option selectable to record the conference call.

30. The method of claim 29, wherein the option to record the call is selectable to record the conference call and to send the recording to the first online identity using e-mail.

31. The method of claim 22, further comprising enabling the first online identity to perceive a call participation option selected by the second online identity.

32. The method of claim 31, wherein enabling the first online identity to perceive the call participation option selected by the second online identity comprises enabling the first online identity to perceive the call processing option selected by the second online identity in a visual display.

33. The method of claim 21, wherein the options include call connection options.

34. The method of claim 33, wherein the call connection options include an option to connect to the conference call over a telephone network.

35. The method of claim 34, wherein the call connection options include an option to connect to the conference call over a data network.

36. The method of claim 19, wherein:
enabling the first identity to respond to the first conference call invitation comprises enabling the first identity to perceive and manipulate a first graphical user interface; and
enabling the second identity to respond to the second conference call invitation comprises enabling the second identity to perceive and manipulate a second graphical user interface.

37. The method of claim 36, wherein the first graphical user interface and the second graphical user interface comprise the same graphical user interface.

38. The method of claim 36, wherein the first graphical user interface and the second graphical user interfaces comprise different graphical user interfaces.

39. The method of claim 17, further comprising:
initiating a call between the caller and the first online identity conditioned on whether the first online identity selects the option to take the call in response to the first electronic communication.

40. The method of claim 39, wherein:
sending the second electronic communication to the second online identity comprises sending the second electronic communication in response to the first online identity selecting to take the call;
enabling the second online identity to respond to the second electronic communication comprises enabling the second online identity to respond by selecting to join the call in progress; and
initiating a conference call comprises converting the call into a conference call between the caller and the first and second online identities conditioned on whether the second online identity selects to join the call in progress.

41. The method of claim 40, wherein enabling the second online identity to respond to the second electronic communication comprises enabling the second online identity to perceive and manipulate a graphical user interface that is configured to inform the second online identity of the call in progress and enable the second online identity to select to join the call in progress.

42. The method of claim 41, wherein the graphical user interface also is configured to inform the second online identity of the identity of the caller and the first online identity.

43. The method of claim 1, wherein sending the second electronic communication is conditioned on the response of the first online identity to the first electronic communication.

44. A computer system for initiating a conference call using a call waiting graphical user interface, the computer system comprising:
a data store for storing configuration data;
a telephony interface element configured to receive an indication that an incoming telephone call is directed to a telephone number;
a call processing element configured to:
identify an account associated with the telephone number to which the incoming telephone call is directed;
access configuration data related to the account from the data store;
identify a first online identity and a second online identity associated with the account based on the configuration data accessed;
send a first electronic communication to the first online identity;
send a second electronic communication to the second online identity;
enable the first online identity to respond to the first electronic communication;

enable the second online identity to respond to the second electronic communication; and initiate a conference call between the caller and the first and second online identities conditioned on whether the responses by the first and second online identities indicate that both the first and second online identities wish to take the call.

45. The computer system of claim 44, wherein the call processing element is further configured to determine the availability of the first online identity to receive the first electronic communication associated with the telephone call.

46. The computer system of claim 45, wherein the call processing element is configured to send the first electronic communication conditioned on whether the first online identity is determined to be available to receive the first electronic communication.

47. The computer system of claim 45, wherein the call processing element is configured to determine the availability of the first online identity by checking the online status for the first online identity, and wherein the call processing element is configured to send the first electronic communication to the first online identity if the first online identity is determined to be online.

48. The computer system of claim 44, wherein the call processing element is configured to enable the first online identity to respond to the first electronic communication by enabling the first identity to respond to the first electronic communication while the caller is waiting for call disposition.

49. The computer system of claim 44, wherein the call processing element is configured to identify an account based on a telephone call by identifying an account based on call-related information received from a telephone network.

50. The computer system of claim 49, wherein the call-related information includes a call destination telephone number and is extracted from an integrated services digital network call setup.

51. The computer system of claim 44, wherein the telephony interface element is further configured to receive from a telephone network call origin information that includes a caller telephone number and is received through an automatic number identification service.

52. The computer system of claim 51, wherein the first and second electronic communications include at least a portion of the call origin information.

53. The computer system of claim 44, wherein the first and second online identities comprise user identifiers through which an online status of an associated user may be determined.

54. The computer system of claim 44, wherein the call processing element is configured to enable the first online identity to respond to the first electronic communication by enabling the first online identity to select from among one or more call processing options.

55. The computer system of claim 54, wherein the call processing options are personalized to the first online identity.

56. The computer system of claim 54, wherein the call processing options include an option to take a message from the caller.

57. The computer system of claim 54, wherein the call processing options include an option to ignore the call.

58. The computer system of claim 54, wherein the call processing options include an option to send an audio message to the caller.

59. The computer system of claim 54, wherein the call processing options include an option to display a list of other online identities associated with the called telephone number or account who have selected to take the call.

60. The computer system of claim 54, wherein the call processing options include an option to take the call.

61. The computer system of claim 60, wherein the call processing element is configured to:
enable the second online identity to respond to the second electronic communication by enabling the second online identity to select from among one or more call processing options; and
initiate a conference call by initiating a conference call conditioned on whether the first and second online identities both select an option to take the call.

62. The computer system of claim 61, wherein the call processing element is configured to initiate a conference call by:
sending to the first online identity a first electronic conference call invitation that is distinct of the first electronic communication;
enabling the first online identity to respond to the first electronic conference call invitation;
sending to the second online identity a second electronic conference call invitation that is distinct of the second electronic communication;
enabling the second online identity to respond to the second electronic conference call invitation; and
initiating a conference call between the caller and the first and second online identities conditioned on whether the responses to the first and second electronic conference call invitations indicate that both the first and second online identities wish to participate in the conference call.

63. The computer system of claim 62, wherein the call processing element is configured to enable the first online identity to respond to the first electronic conference call invitation by enabling the first online identity to select from among one or more options.

64. The computer system of claim 63, wherein the options are personalized to the first online identity.

65. The computer system of claim 63, wherein the options include call participation options.

66. The computer system of claim 65, wherein the call participation options include an option selectable to actively participate in a conference call with the caller.

67. The computer system of claim 65, wherein the call participation options include an option selectable to allow the user to listen but not speak when participating in the conference call with the caller.

68. The computer system of claim 65, wherein the call participation options include an option selectable to not participate in a conference call with the caller.

69. The computer system of claim 65, wherein the call participation options include an option to send a message to the second online identity.

70. The computer system of claim 69, wherein the message is a text message.

71. The computer system of claim 69, wherein the message is an audio message.

72. The computer system of claim 65, wherein the call participation options include an option selectable to record the conference call.

73. The computer system of claim 72, wherein the option to record the call is selectable to record the conference call and to send the recording to the first online identity using e-mail.

74. The computer system of claim 65, wherein the call processing element is further configured to enable the first online identity to perceive a call participation option selected by the second online identity.

75. The computer system of claim 74, wherein the call processing element is configured to enable the first online identity to perceive the call participation option selected by the second online identity by enabling the first online identity to perceive the call processing option selected by the second online identity in a visual display.

76. The computer system of claim 64, wherein the options include call connection options.

77. The computer system of claim 76, wherein the call connection options include an option to connect to the conference call over a telephone network.

78. The computer system of claim 77, wherein the call connection options include an option to connect to the conference call over a data network.

79. The computer system of claim 62, wherein the call processing element is configured to:
enable the first identity to respond to the first conference call invitation by enabling the first identity to perceive and manipulate a first graphical user interface; and
enable the second identity to respond to the second conference call invitation by enabling the second identity to perceive and manipulate a second graphical user interface.

80. The computer system of claim 79, wherein the first graphical user interface and the second graphical user interface comprise the same graphical user interface.

81. The computer system of claim 79, wherein the first graphical user interface and the second graphical user interfaces comprise different graphical user interfaces.

82. The computer system of claim 60, wherein the call processing element is further configured to initiate a call between the caller and the first online identity conditioned on whether the first online identity selects the option to take the call in response to the first electronic communication.

83. The computer system of claim 82, wherein the call processing element is configured to:
send the second electronic communication to the second online identity by sending the second electronic communication in response to the first online identity selecting to take the call;
enable the second online identity to respond to the second electronic communication by enabling the second online identity to respond by selecting to join the call in progress; and
initiate a conference call by converting the call into a conference call between the caller and the first and second online identities conditioned on whether the second online identity selects to join the call in progress.

84. The computer system of claim 83, wherein the call processing element is configured to enable the second online identity to respond to the second electronic communication by enabling the second online identity to perceive and manipulate a graphical user interface that is configured to inform the second online identity of the call in progress and enable the second online identity to select to join the call in progress.

85. The computer system of claim 84, wherein the graphical user interface is also configured to inform the second online identity of the identity of the caller and the first online identity.

86. The computer system of claim 44, wherein the call processing element is configured to send the second electronic communication conditioned on the response of the first online identity to the first electronic communication.

87. An apparatus for initiating a conference call using a call waiting graphical user interface, the apparatus comprising:
means for receiving an indication that an incoming telephone call is directed to a telephone number;
means for identifying an account associated with the telephone number to which the incoming telephone call is directed;
means for accessing configuration data related to the account;
means for identifying a first online identity and a second online identity associated with the account based on the configuration data accessed;
means for sending a first electronic communication to the first online identity;
means for sending a second electronic communication to the second online identity;
means for enabling the first online identity to respond to the first electronic communication;
means for enabling the second online identity to respond to the second electronic communication; and
means for initiating a conference call between the caller and the first and second online identities conditioned on whether the responses by the first and second online identities indicate that both the first and second online identities wish to take the call.

* * * * *